US009182593B2

(12) United States Patent
Mizoguchi et al.

(10) Patent No.: US 9,182,593 B2
(45) Date of Patent: Nov. 10, 2015

(54) OPTICAL DEVICE, OPTICAL SCANNER, AND IMAGE DISPLAY DEVICE

(71) Applicant: Seiko Epson Corporation, Tokyo (JP)

(72) Inventors: Yasushi Mizoguchi, Suwa (JP); Makiko Hino, Matsumoto (JP)

(73) Assignee: Seiko Epson Corporation (JP)

( * ) Notice: Subject to any disclaimer, the term of this patent is extended or adjusted under 35 U.S.C. 154(b) by 392 days.

(21) Appl. No.: 13/861,667

(22) Filed: Apr. 12, 2013

(65) Prior Publication Data

US 2013/0301099 A1    Nov. 14, 2013

(30) Foreign Application Priority Data

May 11, 2012   (JP) ................................. 2012-109007

(51) Int. Cl.
*G02B 26/08* (2006.01)
*G02B 26/10* (2006.01)

(52) U.S. Cl.
CPC .......... *G02B 26/0816* (2013.01); *G02B 26/085* (2013.01); *G02B 26/0858* (2013.01); *G02B 26/101* (2013.01)

(58) Field of Classification Search
CPC .. G02B 26/101; G02B 26/105; G02B 26/085; G02B 26/0833
USPC .......... 359/198.1, 199.3, 200.7, 199.1, 212.1, 359/213.1, 223.1, 224.1
See application file for complete search history.

(56) References Cited

U.S. PATENT DOCUMENTS

| 5,912,608 | A | 6/1999 | Asada |
| 7,688,490 | B2 * | 3/2010 | Mizoguchi ................. 359/199.3 |
| 7,697,181 | B2 | 4/2010 | Mizoguchi |
| 7,852,539 | B2 | 12/2010 | Mizoguchi |
| 2008/0218823 | A1 | 9/2008 | Mizoguchi |
| 2010/0238533 | A1 | 9/2010 | Nakamura et al. |
| 2011/0205608 | A1 | 8/2011 | Mizoguchi |
| 2012/0086996 | A1 | 4/2012 | Mizoguchi et al. |
| 2012/0147445 | A1 | 6/2012 | Mizoguchi |

FOREIGN PATENT DOCUMENTS

| JP | 8322227 A | 12/1996 |
| JP | 2008-216920 A | 9/2008 |

(Continued)

OTHER PUBLICATIONS

Extended European Search Report for Application No. EP 13 16 7016 dated Jul. 23, 2013 (5 pages).

*Primary Examiner* — Euncha Cherry
(74) *Attorney, Agent, or Firm* — Harness, Dickey & Pierce, P.L.C.

(57) ABSTRACT

An optical scanner is an optical device including a base portion that is rotatable about the Y-axis, a frame portion that is rotatable about the X-axis intersecting the Y-axis, and a shaft portion that supports the base portion so as to be rotatable about the Y-axis with respect to the frame portion. The optical scanner includes a light reflecting plate that is fixed to the base portion and includes a light reflecting portion with a light reflecting property. The frame portion is provided so as to surround the base portion. The shaft portion includes one end connected to the base portion and the other end connected to the frame portion. The light reflecting plate is separated from the shaft portion in the thickness direction of the light reflecting plate and overlaps the shaft portion, as viewed from the thickness direction.

20 Claims, 15 Drawing Sheets

(56) References Cited

FOREIGN PATENT DOCUMENTS

| | | |
|---|---|---|
| JP | 2010-217648 A | 9/2010 |
| JP | 2011-123363 A | 6/2011 |
| JP | 2011-137961 A | 7/2011 |
| JP | 2011-138046 A | 7/2011 |
| JP | 2011-138888 A | 7/2011 |
| JP | 2012-078738 A | 4/2012 |
| JP | 2012-108164 A | 6/2012 |
| JP | 2012-108165 A | 6/2012 |
| JP | 2012-123116 A | 6/2012 |
| JP | 2012-123117 A | 6/2012 |
| JP | 2012-123140 A | 6/2012 |
| JP | 2012-128307 A | 7/2012 |
| WO | WO-2011-080883 A1 | 7/2011 |

\* cited by examiner

FIRST VOLTAGE
(HORIZONTAL SCANNING DRIVING SIGNAL)

SECOND VOLTAGE
(VERTICAL SCANNING DRIVING SIGNAL)

OPTICAL DEVICE, OPTICAL SCANNER, AND IMAGE DISPLAY DEVICE

BACKGROUND

1. Technical Field

The present invention relates to an optical device, an optical scanner, and an image display device.

2. Related Art

As an optical device used in, for example, a projector, an optical scanner has been known which performs two-dimensional scanning with light (for example, see JP-A-8-322227).

The optical scanner disclosed in JP-A-8-322227 includes an insulating substrate which is provided with a pair of permanent magnets and a scanner body which is supported by the insulating substrate so as to be disposed between the pair of permanent magnets. The scanner body includes a frame-shaped supporting portion, a frame-shaped outer movable plate which is provided inside the supporting portion, and an inner movable plate (mirror) which is provided inside the outer movable plate. The outer movable plate is connected to the supporting portion through a pair of first torsion bars which extend in the X-axis direction and the inner movable plate is connected to the outer movable plate through a second torsion bar which extends in the Y-axis direction perpendicular to the X-axis direction. In addition, coils are provided in the outer movable plate and the inner movable plate.

In the optical scanner having the above-mentioned structure, the interaction between the magnetic field which is generated from each coil by the application of a voltage and the magnetic field generated between a pair of permanent magnets causes the outer movable plate to be rotated about the X-axis together with the inner movable plate, using the first torsion bar as the central axis, and causes the inner movable plate to be rotated about the Y-axis using the second torsion bar as the central axis.

However, in the optical scanner disclosed in JP-A-8-322227, the inner movable plate and the second torsion bar are arranged so as not to overlap each other in a plan view (as viewed from the thickness direction of the inner movable plate). Therefore, the overall dimensions increase depending on the dimensions of the mirror (inner movable plate).

In particular, in the optical scanner disclosed in JP-A-8-322227, for example, when the dimensions of the inner movable plate increases, the second torsion bar needs to be arranged outside in order to respond to the increase in the dimensions. As a result, the dimensions of the outer movable plate increase and the first torsion bar needs to be arranged outside in order to respond to the increase in the dimensions. In addition, when the dimensions of the outer movable plate increase, the mass of the outer movable plate increases. Therefore, the length of the first torsion bar increases and driving force required to rotate the outer movable plate increases.

SUMMARY

An advantage of some aspects of the invention is to provide an optical device, an optical scanner, and an image display device capable of performing two-dimensional scanning with light while reducing the size of a device.

An aspect of the invention is directed to an optical device including: a movable portion that is rotatable about a first axis; a frame portion that is rotatable about a second axis intersecting the first axis; a first shaft portion that supports the movable portion so as to be rotatable about the first axis with respect to the frame portion; and a light reflecting plate that is fixed to the movable portion and includes a light reflecting portion with a light reflecting property. The frame portion is provided so as to surround the movable portion. The first shaft portion includes one end connected to the movable portion and the other end connected to the frame portion. The light reflecting plate is separated from the first shaft portion in a thickness direction of the light reflecting plate and overlaps at least a part of the first shaft portion, as viewed from the thickness direction.

According to the optical device having the above-mentioned structure, it is possible to rotate the movable portion about the first axis and the second axis. Therefore, it is possible to perform two-dimensional scanning with light reflected from the light reflecting portion.

In particular, since the light reflecting plate is separated from the first shaft portion in the thickness direction and overlaps at least a part of the first shaft portion as viewed from the thickness direction, it is possible to reduce the size of the optical device.

In the optical device according to the aspect of the invention, it is preferable that the light reflecting plate covers the entire first shaft portion, as viewed from the thickness direction.

According to this configuration, it is possible to increase the area of the light reflecting portion. In addition, it is possible to prevent the generation of stray light due to the reflection of light which is not incident on the light reflecting portion from the first shaft portion.

In the optical device according to the aspect of the invention, it is preferable that the light reflecting plate covers the entire frame portion, as viewed from the thickness direction.

According to this configuration, it is possible to increase the area of the light reflecting portion. In addition, it is possible to prevent the generation of stray light due to the reflection of light which could not be incident on the light reflecting portion from the frame portion.

It is preferable that the optical device according to the aspect of the invention further includes a second shaft portion that is connected to the frame portion and supports the frame portion so as to be rotatable about the second axis, and the light reflecting plate covers the entire second shaft portion, as viewed from the thickness direction.

According to this configuration, it is possible to increase the area of the light reflecting portion. In addition, it is possible to prevent the generation of stray light due to the reflection of light which could not be incident on the light reflecting portion from the second shaft portion.

In the optical device according to the aspect of the invention, it is preferable that the light reflecting plate has a shape including a portion that protrudes in a direction along at least one of the first axis and the second axis, as viewed from the thickness direction.

According to this configuration, it is possible to provide the light reflecting plate so as to cover the first shaft portion, the frame portion, or the second shaft portion, as viewed from the thickness direction, while suppressing the moment of inertia of the light reflecting plate about the first axis or the second axis.

In the optical device according to the aspect of the invention, it is preferable that the light reflecting plate is fixed to the movable portion through a spacer.

According to this configuration, it is possible to rotate the light reflecting plate while preventing contact with the first shaft portion, the frame portion, and the second shaft portion.

In the optical device according to the aspect of the invention, it is preferable that a hard layer which is made of a material harder than that forming the light reflecting plate is formed on at least a portion of a surface of the light reflecting plate close to the movable portion.

According to this configuration, it is possible to increase the rigidity of the light reflecting plate and prevent the warping of the light reflecting plate.

It is preferable that the optical device according to the aspect of the invention further includes a permanent magnet that is provided in the frame portion, a coil that is provided so as to face the frame portion, and a voltage applying unit that applies a voltage to the coil, and the voltage applying unit applies the voltage to the coil to rotate the movable portion about the first axis and the second axis.

According to this configuration, it is possible to rotate the light reflecting plate about the first axis and the second axis using an electromagnetic driving method (moving magnet method) while reducing the size of a device. In addition, since the coil is separated from a vibration system of the optical device, it is possible to prevent an adverse effect due to heat generated from the coil.

It is preferable that the optical device according to the aspect of the invention further includes a coil that is provided in the frame portion, a permanent magnet that is provided so as to face the frame portion, and a voltage applying unit that applies a voltage to the coil, and the voltage applying unit applies the voltage to the coil to rotate the movable portion about the first axis and the second axis.

According to this configuration, it is possible to rotate the light reflecting plate about the first axis and the second axis using the electromagnetic driving method (moving coil method) while reducing the size of a device.

It is preferable that the optical device according to the aspect of the invention further includes a piezoelectric element that is provided in the second shaft portion and a voltage applying unit that applies a voltage to the piezoelectric element, and the voltage applying unit applies the voltage to the piezoelectric element to rotate the movable portion about the first axis and the second axis.

According to this configuration, it is possible to rotate the light reflecting plate about the first axis and the second axis using a piezoelectric driving method while reducing the size of a device.

In the optical device according to the aspect of the invention, it is preferable that the voltage applying unit includes a first voltage generating unit that generates a first voltage with a first frequency, a second voltage generating unit that generates a second voltage with a second frequency different from the first frequency, and a voltage superimposition unit that superimposes the first voltage and the second voltage, and the voltage applying unit rotates the movable portion about the first axis at the first frequency and rotates the movable portion about the second axis at the second frequency.

According to this configuration, it is possible to reduce the number of components forming a driving source. Therefore, it is possible to reduce the size and costs of the optical device.

In the optical device according to the aspect of the invention, it is preferable that, when the length of the frame portion in a direction along the first axis is a and the length of the frame portion in a direction along the second axis is b, a>b is satisfied.

According to this configuration, it is possible to suppress an increase in the length of the optical device in the direction along the second axis while ensuring the length required for the first shaft portion.

Another aspect of the invention is directed to an optical scanner including: a movable portion that is rotatable about a first axis; a frame portion that is rotatable about a second axis intersecting the first axis; a first shaft portion that supports the movable portion so as to be rotatable about the first axis with respect to the frame portion; and a light reflecting plate that is fixed to the movable portion and includes a light reflecting portion with a light reflecting property. The frame portion is provided so as to surround the movable portion. The first shaft portion includes one end connected to the movable portion and the other end connected to the frame portion. The light reflecting plate is separated from the first shaft portion in a thickness direction and overlaps at least a part of the first shaft portion, as viewed from the thickness direction.

According to the optical scanner having the above-mentioned configuration, it is possible to perform two-dimensional scanning with light while reducing the size of a device.

Still another aspect of the invention is directed to an image display device including an optical scanner. The optical scanner includes a movable portion that is rotatable about a first axis, a frame portion that is rotatable about a second axis intersecting the first axis, a first shaft portion that supports the movable portion so as to be rotatable about the first axis with respect to the frame portion, and a light reflecting plate that is fixed to the movable portion and includes a light reflecting portion with a light reflecting property. The frame portion is provided so as to surround the movable portion. The first shaft portion includes one end connected to the movable portion and the other end connected to the frame portion. The light reflecting plate is separated from the first shaft portion in a thickness direction of the light reflecting plate and overlaps at least apart of the first shaft portion, as viewed from the thickness direction.

According to the image display apparatus having the above-mentioned configuration, it is possible to perform two-dimensional scanning with light while reducing the size of a device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an optical device, an optical scanner, and an image display device according to exemplary embodiments of the invention will be described with reference to the accompanying drawings. In the following embodiments, a representative example in which the optical device according to the invention is applied to the optical scanner will be described.

First Embodiment

Figure 1:
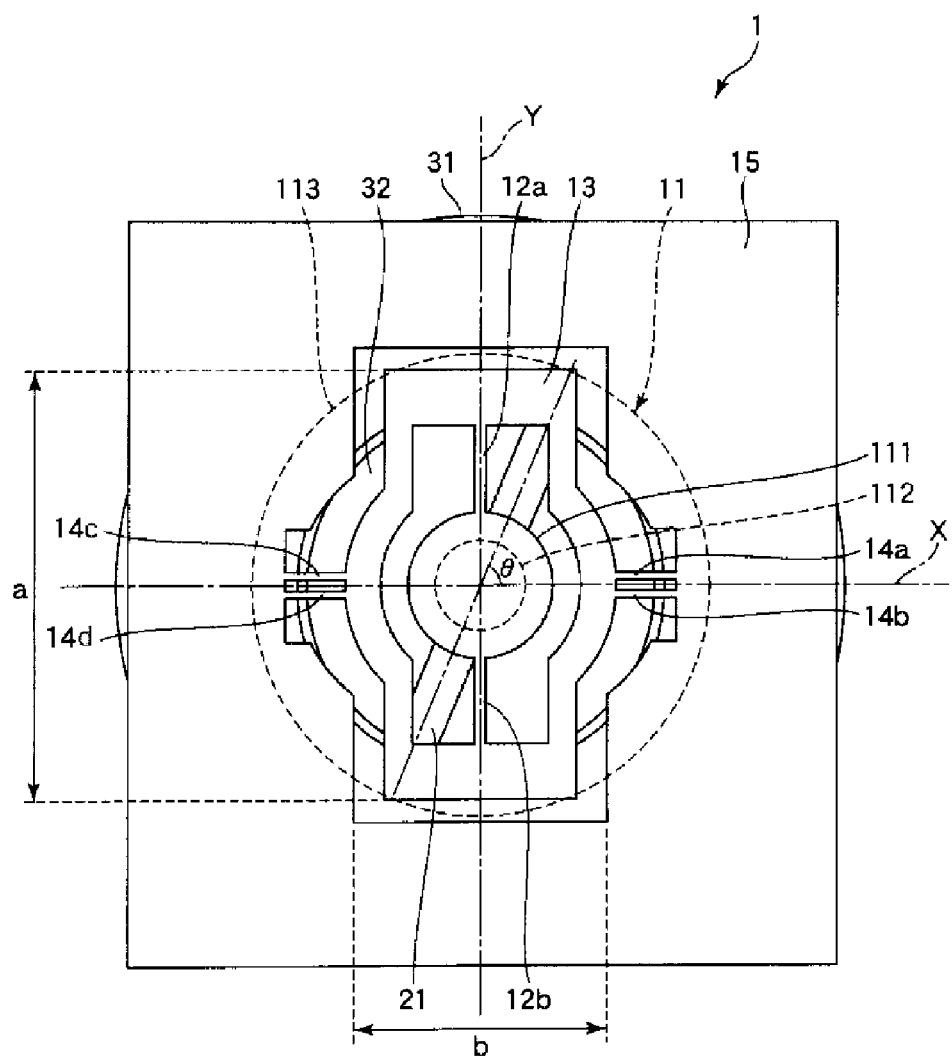
FIG. 1 is a plan view illustrating an optical scanner (optical device) according to a first embodiment of the invention.
Figure 2:
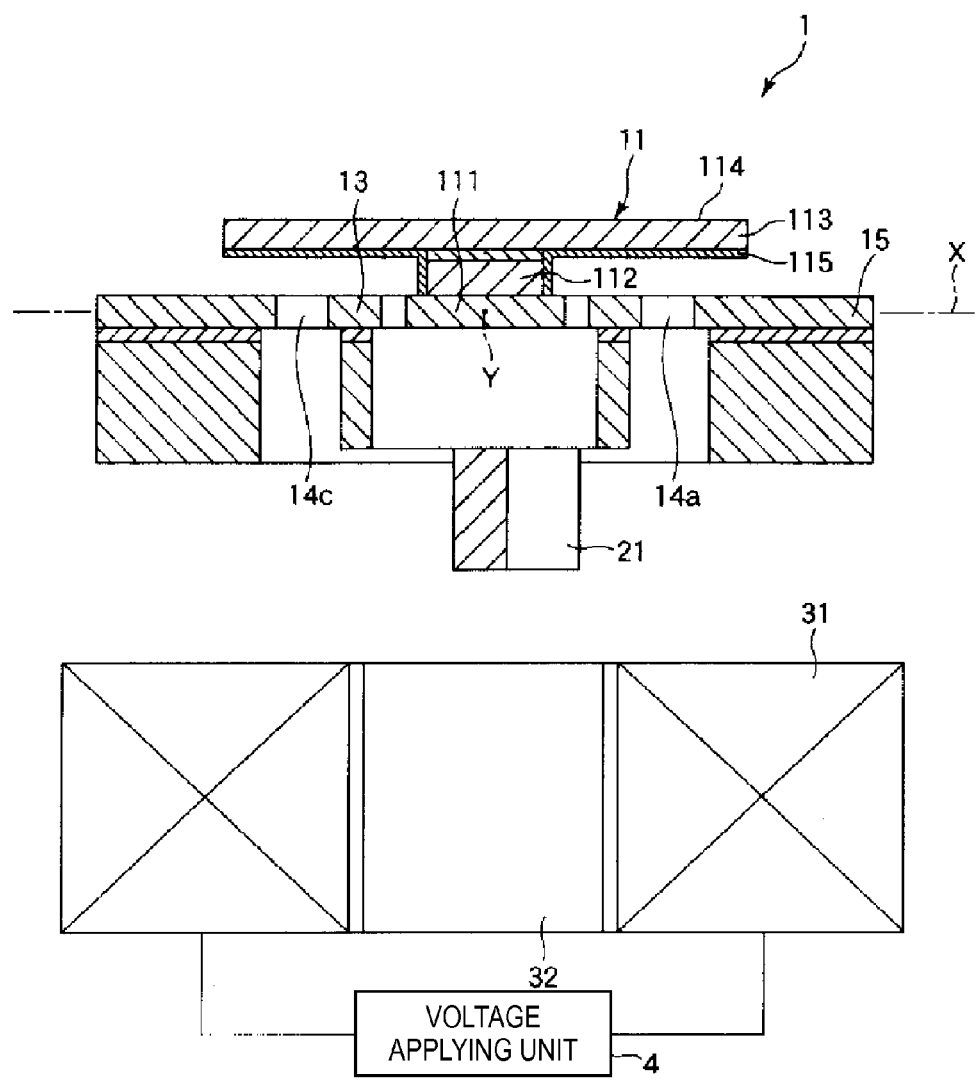
FIG. 2 is a cross-sectional view (a cross-sectional view taken along the X-axis) illustrating the optical scanner shown in FIG. 1.
Figure 3:
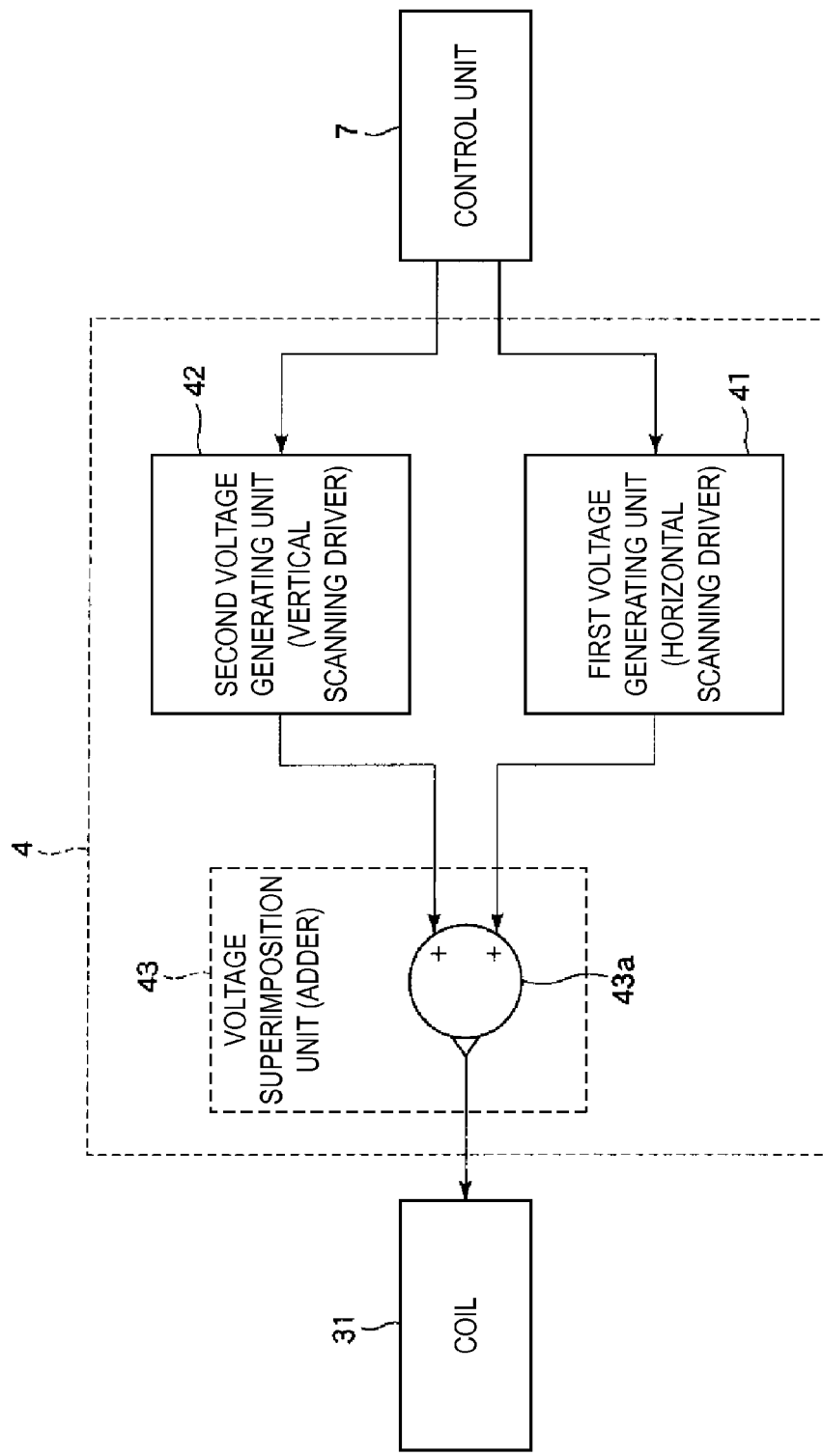
FIG. 3 is a block diagram illustrating a voltage applying unit of a driving unit included in the optical scanner shown in FIG. 1.
Figure 4A:
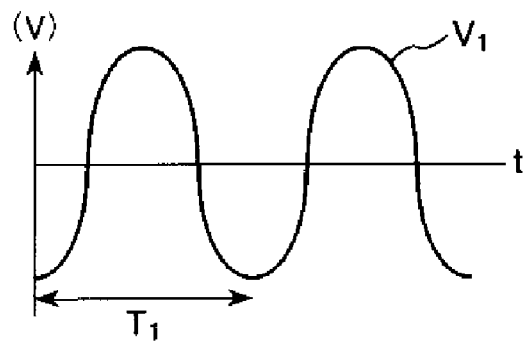
FIGS. 4A and 4B are diagrams illustrating examples of voltages generated by a first voltage generating unit and a second voltage generating unit shown in FIG. 3.
Figure 4B:
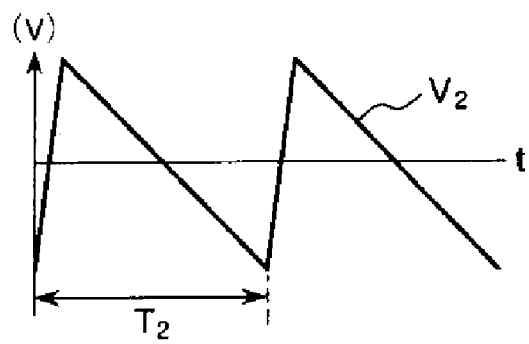

FIG. 1 is a plan view illustrating an optical scanner (optical device) according to a first embodiment of the invention. FIG. 2 is a cross-sectional view illustrating the optical scanner shown in FIG. 1 (a cross-sectional view taken along the X-axis). FIG. 3 is a block diagram illustrating a voltage applying unit of a driving unit included in the optical scanner shown in FIG. 1. FIGS. 4A and 4B are diagrams illustrating examples of voltages generated by a first voltage generating unit and a second voltage generating unit shown in FIG. 3. Hereinafter, for convenience of explanation, the upper and lower sides of FIG. 2 are referred to as "upper" and "lower" sides.

As shown in FIGS. 1 and 2, an optical scanner 1 includes a movable mirror portion 11, a pair of shaft portions 12a and 12b (first shaft portions), a frame portion 13, two pairs of shaft portions 14a, 14b, 14c, and 14d (second shaft portions), a supporting portion 15, permanent magnets 21, a coil 31, a magnetic core 32, and a voltage applying unit 4.

The movable mirror portion 11 and the pair of shaft portions 12a and 12b form a first vibration system that is rotated (reciprocatively rotated or oscillated) about the Y-axis (first axis) aligned with the shaft portions 12a and 12b. In addition, the movable mirror portion 11, the pair of shaft portions 12a and 12b, the frame portion 13, the two pairs of shaft portions 14a, 14b, 14c, and 14d, and the permanent magnet 21 form a second vibration system that is rotated (reciprocatively rotated or oscillated) about the X-axis (second axis).

The permanent magnet 21, the coil 31, and the voltage applying unit 4 form the driving unit that drives the first vibration system and the second vibration system (that is, rotates the movable mirror portion 11 about the X-axis and the Y-axis).

Next, each unit of the optical scanner 1 will be sequentially described in detail.

The movable mirror portion 11 includes a base portion (movable portion) 111 and a light reflecting plate 113 which is fixed to the base portion 111 through a spacer 112.

A light reflecting portion 114 with a light reflecting property is provided on the upper surface (one surface) of the light reflecting plate 113.

The light reflecting plate 113 is separated from the shaft portions 12a and 12b in the thickness direction thereof and overlaps the shaft portions 12a and 12b, as viewed from the thickness direction (hereinafter, referred to as "in a plan view").

Therefore, it is possible to increase the area of the surface of the light reflecting plate 113 while reducing the distance between the shaft portion 12a and the shaft portion 12b. Since the distance between the shaft portion 12a and the shaft portion 12b can be reduced, it is possible to reduce the size of the frame portion 13. Since the size of the frame portion 13 can be reduced, it is possible to reduce the distance between the shaft portions 14a and 14b and the shaft portions 14c and 14d.

In this way, even when the area of the surface of the light reflecting plate 113 increases, it is possible to reduce the size of the optical scanner 1.

The light reflecting plate 113 is formed so as to cover the entire shaft portions 12a and 12b in a plan view. In other words, each of the shaft portions 12a and 12b is disposed inside the outer circumference of the light reflecting plate 113 in a plan view. Therefore, the area of the surface of the light reflecting plate 113 increases. As a result, it is possible to increase the area of the light reflecting portion 114. In addition, it is possible to prevent the generation of stray light due to the reflection of unnecessary light (for example, light which could not be incident on the light reflecting portion 114) from the shaft portions 12a and 12b.

The light reflecting plate 113 is formed so as to cover the entire frame portion 13 in a plan view. In other words, the frame portion 13 is disposed inside the outer circumference of the light reflecting plate 113 in a plan view. Therefore, the area of the surface of the light reflecting plate 113 increases. As a result, it is possible to increase the area of the light reflecting portion 114. In addition, it is possible to prevent the generation of stray light due to the reflection of unnecessary light from the frame portion 13.

The light reflecting plate 113 is formed so as to cover all of the shaft portions 14a, 14b, 14c, and 14d in a plan view. In other words, each of the shaft portions 14a, 14b, 14c, and 14d is disposed inside the outer circumference of the light reflecting plate 113 in a plan view. Therefore, the area of the surface of the light reflecting plate 113 increases. As a result, it is possible to increase the area of the light reflecting portion 114. In addition, it is possible to prevent the generation of stray light due to the reflection of unnecessary light from the shaft portions 14a, 14b, 14c, and 14d.

In this embodiment, the light reflecting plate 113 has a circular shape in a plan view. The planar shape of the light reflecting plate 113 is not limited thereto, but may be, for example, an ellipse or a polygon such as a rectangle.

A hard layer 115 is provided on the lower surface (the other surface or a surface of the light reflecting plate 113 close to the base portion 111) of the light reflecting plate 113.

The hard layer 115 is made of a material harder than that forming the body of the light reflecting plate 113. In this way, it is possible to increase the rigidity of the light reflecting plate 113. Therefore, it is possible to prevent or suppress the warping of the light reflecting plate 113 during rotation. In addition, the thickness of the light reflecting plate 113 is reduced to suppress the moment of inertia when the light reflecting plate 113 is rotated about the X-axis and the Y-axis.

The hard layer 115 may be made of any material harder than that forming the body of the light reflecting plate 113.

For example, diamond, crystal, sapphire, lithium tantalate, potassium niobate, or a carbon nitride film may be used as the material forming the hard layer 115. In particular, it is preferable to use diamond as the material.

The thickness (average) of the hard layer 115 is not particularly limited. However, the thickness is preferably in the range of about 1 µm to 10 µm and more preferably in the range of about 1 µm to 5 µm.

The hard layer 115 may be a single layer or a laminate of a plurality of layers. The hard layer 115 may be provided on a portion of or the entire lower surface of the light reflecting plate 113. In addition, the hard layer 115 is provided if necessary and may be omitted.

The hard layer 115 may be formed by, for example, a chemical vapor deposition (CVD) method, such as plasma CVD, thermal CVD, or laser CVD, a dry plating method, such as vacuum deposition, sputtering, or ion plating, a wet plating method, such as electrolytic plating, immersion plating, or electroless plating, thermal spraying, and a sheet-shaped member bonding method.

The light reflecting plate has a shape which protrudes in the direction along the first and second axes, which makes it possible to suppress an increase in the moment of inertia of the light reflecting plate. As a result, it is possible to effectively reduce stray light in each shaft portion.

The lower surface of the light reflecting plate 113 is fixed to the base portion 111 through the spacer 112. In this way, it is possible to rotate the light reflecting plate 113 about the Y-axis while preventing the contact of the light reflecting plate 113 with the shaft portions 12a and 12b, the frame portion 13, and the shaft portions 14a, 14b, 14c, and 14d.

The base portion 111 is disposed inside the outer circumference of the light reflecting plate 113 in a plan view. It is preferable that the area of the base portion 111 in a plan view be as small as possible as long as the base portion 111 can support the light reflecting plate 113 through the spacer 112. In this way, it is possible to reduce the distance between the shaft portion 12a and the shaft portion 12b while increasing the area of the surface of the light reflecting plate 113.

The frame portion 13 has a frame shape and is provided so as to surround the base portion 111 of the movable mirror portion 11. In other words, the base portion 111 of the movable mirror portion 11 is provided inside the frame portion 13 having the frame shape.

The frame portion 13 is supported by the supporting portion 15 through the shaft portions 14a, 14b, 14c, and 14d. The base portion 111 of the movable mirror portion 11 is supported by the frame portion 13 through the shaft portions 12a and 12b.

The length of the frame portion 13 in a direction along the Y-axis is more than the length thereof in a direction along the X-axis. That is, when the length of the frame portion 13 in the direction along the Y-axis is "a" and the length of the frame portion 13 in the direction along the X-axis is "b", a>b is satisfied. In this way, it is possible to suppress the length of the optical scanner 1 in the direction along the X-axis while ensuring the necessary length of the shaft portions 12a and 12b.

The frame portion 13 has a shape corresponding to the outer shape of a structure including the base portion 111 of the movable mirror portion 11 and the pair of shaft portions 12a and 12b in a plan view. In this way, it is possible to reduce the size of the frame portion 13 while permitting the vibration of the first vibration system including the movable mirror portion 11 and the pair of shaft portions 12a and 12b, that is, the rotation of the movable mirror portion 11 about the Y-axis.

The shape of the frame portion 13 is not limited to that shown in the drawings as long as the frame portion 13 has a frame shape.

Each of the shaft portions 12a and 12b and the shaft portions 14a, 14b, 14c, and 14d can be elastically deformed.

The shaft portions 12a and 12b connect the movable mirror portion 11 and the frame portion 13 such that the movable mirror portion 11 can be rotated about the Y-axis (first axis). The shaft portions 14a, 14b, 14c, and 14d connect the frame portion 13 and the supporting portion 15 such that the frame portion 13 can be rotated about the X-axis (second axis) perpendicular to the Y-axis.

The shaft portions 12a and 12b are arranged so as to be opposite to each other with the base portion 111 of the movable mirror portion 11 interposed therebetween. In addition, each of the shaft portions 12a and 12b has a longitudinal shape which extends in the direction along the Y-axis. Each of the shaft portions 12a and 12b has one end connected to the base portion 111 and the other end connected to the frame portion 13. Each of the shaft portions 12a and 12b is arranged such that the central axis thereof is aligned with the Y-axis.

The shaft portions 12a and 12b are torsionally deformed with the rotation of the movable mirror portion 11 about the Y-axis.

The shaft portions 14a and 14b and the shaft portions 14c and 14d are arranged so as to be opposite to each other with the frame portion 13 interposed therebetween. Each of the shaft portions 14a, 14b, 14c, and 14d has a longitudinal shape which extends in the direction along the X-axis. Each of the shaft portions 14a, 14b, 14c, and 14d has one end connected to the frame portion 13 and the other end connected to the supporting portion 15. The shaft portions 14a and 14b are arranged so as to be opposite to each other with the X-axis interposed therebetween. Similarly, the shaft portions 14c and 14d are arranged so as to be opposite to each other with the X-axis interposed therebetween.

For the shaft portions 14a, 14b, 14c, and 14d, the entire shaft portions 14a and 14b and the entire shaft portions 14c and 14d are torsionally deformed with the rotation of the frame portion 13 about the X-axis.

As such, since the movable mirror portion 11 can be rotated about the Y-axis and the frame portion 13 can be rotated about the X-axis, it is possible to rotate the movable mirror portion 11 (in other words, the light reflecting plate 113) about two axes, that is, the X-axis and the Y-axis perpendicular to each other.

The shapes of the shaft portions 12a and 12b and the shaft portions 14a, 14b, 14c, and 14d are not limited to the above-mentioned shapes. For example, each of the shaft portions 12a and 12b and the shaft portions 14a, 14b, 14c, and 14d may include at least one curved or bent portion or at least one branched portion.

The base portion 111, the shaft portions 12a and 12b, the frame portion 13, the shaft portions 14a, 14b, 14c, and 14d, and the supporting portion 15 are integrally formed.

In this embodiment, the base portion 111, the shaft portions 12a and 12b, the frame portion 13, the shaft portions 14a, 14b, 14c, and 14d, and the supporting portion 15 are formed by etching an SOI substrate having a first Si layer (device layer), a $SiO_2$ layer (box layer), and a second Si layer (handle layer) formed in this order. In this way, the first vibration system and the second vibration system can have good vibration characteristics. The SOI substrate can be finely processed by etching. Therefore, when the SOI substrate is used to form the base portions 111, the shaft portions 12a and 12b, the frame portion 13, the shaft portions 14a, 14b, 14c, and 14d, and the supporting portion 15, it is possible to improve the accuracy of the dimensions of the components. In addition, it is possible to reduce the size of the optical scanner 1.

Each of the base portion 111, the shaft portions 12a and 12b, and the shaft portions 14a, 14b, 14c, and 14d is formed by the first Si layer of the SOI substrate. Therefore, it is possible to improve the elasticity of the shaft portions 12a and 12b and the shaft portions 14a, 14b, 14c, and 14d. In addition, it is possible to prevent the contact of the base portion 111 with the frame portion 13 when the base portion 111 is rotated about the Y-axis.

Each of the frame portion 13 and the supporting portion 15 is formed by a laminate of the first Si layer, the $SiO_2$ layer, and the second Si layer of the SOI substrate. Therefore, it is possible to improve the rigidity of the frame portion 13 and the supporting portion 15. In addition, the $SiO_2$ layer and the second Si layer of the frame portion 13 function as a rib which improves the rigidity of the frame portion 13 and have a function of preventing the contact of the movable mirror portion 11 with the permanent magnet 21.

It is preferable that an antireflection treatment be performed for the upper surfaces of the first shaft portion, the second shaft portion, the frame portion 13, and the supporting portion 15 which are disposed outside the light reflecting plate 113 in a plan view. In this way, it is possible to prevent the generation of stray light due to unnecessary light emitted to portions other than the light reflecting plate 113.

The antireflection treatment is not particularly limited. Examples of the antireflection treatment include the formation of an antireflection film (dielectric multi-layer film), a surface roughening treatment, and a blackening treatment.

The materials forming the base portion 111, the shaft portions 12a and 12b, and the shaft portions 14a, 14b, 14c, and 14d and the methods of forming them are illustrative examples, but the invention is not limited thereto.

In this embodiment, the spacer 112 and the light reflecting plate 113 are also formed by etching the SOI substrate. The spacer 112 is formed by a laminate of the $SiO_2$ layer and the second Si layer in the SOI substrate. The light reflecting plate 113 is formed by the first Si layer of the SOI substrate.

As such, since the SOI substrate is used to form the spacer 112 and the light reflecting plate 113, it is possible to simply manufacture the spacer 112 and the light reflecting plate 113 bonded to each other with high accuracy.

The spacer 112 is bonded to the base portion 111 by a bonding material (not shown) such as an adhesive or brazing filler metal.

The permanent magnet 21 is bonded to the lower surface (the surface opposite to the light reflecting plate 113) of the frame portion 13.

A method of bonding the permanent magnet 21 and the frame portion 13 is not particularly limited. For example, a bonding method using an adhesive may be used.

The permanent magnet 21 is magnetized in a direction which is inclined with respect to the X-axis and the Y-axis in a plan view.

In this embodiment, the permanent magnet 21 has a longitudinal shape (rod shape) which extends in the direction inclined with respect to the X-axis and the Y-axis. The permanent magnet 21 is magnetized in the longitudinal direction. That is, the permanent magnet 21 is magnetized such that one end thereof is the S pole and the other end is the N pole.

In addition, the permanent magnet 21 is symmetric with respect to the intersection of the X-axis and the Y-axis in a plan view.

In this embodiment, one permanent magnet is provided in the frame portion 13. However, the invention is not limited thereto. For example, two permanent magnets may be provided in the frame portion 13. In this case, for example, two long permanent magnets may be provided in the frame portion 13 such that they are opposite to each other with the base portion 111 interposed therebetween and are parallel to each other in a plan view.

The tilt angle θ of the magnetization direction (extension direction) of the permanent magnet 21 with reference to the X-axis is not particularly limited, but is preferably equal to or more than 30° and equal to or less than 60°, more preferably, equal to or more than 45° and equal to or less than 60°, and most preferably, 45°. When the permanent magnet 21 is provided in this way, it is possible to smoothly and reliably rotate the movable mirror portion 11 about the X-axis.

On the other hand, when the tilt angle θ is less than the lower limit, in some cases, it is difficult to sufficiently rotate the movable mirror portion 11 about the X-axis according to conditions, such as the level of the voltage applied from the voltage applying unit 4 to the coil 31. When the tilt angle θ is more than the upper limit, in some cases, it is difficult to sufficiently rotate the movable mirror portion 11 about the Y-axis according to conditions.

For example, a neodymium magnet, a ferrite magnet, a samarium-cobalt magnet, an alnico magnet, or a bonded magnet may be appropriately used as the permanent magnet 21. The permanent magnet 21 is formed by magnetizing a highly magnetic material. For example, the permanent magnet is formed by arranging a hard magnetic material before magnetization in the frame portion 13 and magnetizing the hard magnetic material. When the magnetized permanent magnet 21 is provided in the frame portion 13, in some cases, it is difficult to arrange the permanent magnet 21 at a desired position due to the influence of the external magnetic field or the magnetic field from other components.

The coil 31 is provided immediately below the permanent magnet 21. That is, the coil 31 is provided so as to face the lower surface of the frame portion 13. In this way, it is possible to effectively apply the magnetic field generated from the coil 31 to the permanent magnet 21. Therefore, it is possible to reduce the power consumption and size of the optical scanner 1.

In this embodiment, the coil 31 is wound around the magnetic core 32. Therefore, it is possible to effectively apply the magnetic field generated from the coil 31 to the permanent magnet 21. The magnetic core 32 may be omitted.

The coil 31 is electrically connected to the voltage applying unit 4.

When the voltage applying unit 4 applies a voltage to the coil 31, the magnetic field having magnetic flux perpendicular to the X-axis and the Y-axis is generated from the coil 31.

As shown in FIG. 3, the voltage applying unit 4 includes a first voltage generating unit 41 that generates a first voltage $V_1$ for rotating the movable mirror portion 11 about the Y-axis, a second voltage generating unit 42 that generates a second voltage $V_2$ for rotating the movable mirror portion 11 about the X-axis, and a voltage superimposition unit 43 that superimposes the first voltage $V_1$ and the second voltage $V_2$, and applies the voltage superimposed by the voltage superimposition unit 43 to the coil 31.

As shown in FIG. 4A, the first voltage generating unit 41 generates the first voltage $V_1$ (horizontal scanning voltage) which is periodically changed with a period $T_1$. That is, the first voltage generating unit 41 generates the first voltage $V_1$ with a first frequency ($1/T_1$).

The first voltage $V_1$ has the waveform of a sine wave. Therefore, the optical scanner 1 can effectively perform main scanning with light. The waveform of the first voltage $V_1$ is not limited thereto.

The first frequency ($1/T_1$) is not particularly limited as long as it is suitable for horizontal scanning. However, it is preferable that the first frequency be in the range of 10 kHz to 40 kHz.

In this embodiment, the first frequency is set to be equal to the torsional resonance frequency (f1) of the first vibration system (torsional vibration system) including the movable mirror portion 11 and the pair of shaft portions 12a and 12b. That is, the first vibration system is designed (manufactured) such that the torsional resonance frequency f1 thereof is suitable for horizontal scanning. Therefore, it is possible to increase the rotation angle of the movable mirror portion 11 about the Y-axis.

As shown in FIG. 4B, the second voltage generating unit 42 generates the second voltage $V_2$ (vertical scanning voltage) that is periodically changed with a period $T_2$ different from the period $T_1$. That is, the second voltage generating unit 42 generates the second voltage $V_2$ with a second frequency ($1/T_2$).

The second voltage $V_2$ has the waveform of a sawtooth wave. Therefore, the optical scanner 1 can effectively perform vertical scanning (sub-scanning) with light. The waveform of the second voltage $V_2$ is not limited thereto.

The second frequency ($1/T_2$) is different from the first frequency ($1/T_1$) and is not particularly limited as long as it is suitable for vertical scanning. However, it is preferable that the second frequency be in the range of 30 Hz to 120 Hz (about 60 Hz). As such, when the frequency of the second voltage $V_2$ is about 60 Hz and the frequency of the first voltage $V_1$ is in the range of 10 kHz to 40 kHz as described above, it is possible to rotate the movable mirror portion 11 about two axes (the X-axis and the Y-axis) perpendicular to each other at a frequency which is suitable to draw an image in the display. However, a combination of the frequency of the first voltage $V_1$ and the frequency of the second voltage $V_2$ is not particularly limited as long as the movable mirror portion 11 can be rotated about each of the X-axis and the Y-axis.

In this embodiment, the frequency of the second voltage $V_2$ is adjusted to be different from the torsional resonance frequency (resonance frequency) of the second vibration system (torsional vibration system) including the movable mirror portion 11, the pair of shaft portions 12a and 12b, the frame portion 13, the two pairs of shaft portions 14a, 14b, 14c, and 14d, and the permanent magnet 21.

It is preferable that the frequency (second frequency) of the second voltage $V_2$ be less than the frequency (first frequency) of the first voltage $V_1$. That is, it is preferable that the period $T_2$ is longer than the period $T_1$. In this way, it is possible to reliably and smoothly rotate the movable mirror portion 11 about the X-axis at the second frequency while rotating the movable mirror portion 11 about the Y-axis at the first frequency.

When the torsional resonance frequency of the first vibration system is f1 [Hz] and the torsional resonance frequency of the second vibration system is f2 [Hz], the frequencies f1 and f2 preferably satisfy the relationship f2<f1 and more preferably, the relationship f1≥10f2. In this way, it is possible to smoothly rotate the movable mirror portion 11 about the X-axis at the frequency of the second voltage $V_2$ while rotating the movable portion 11 about the Y-axis at the frequency of the first voltage $V_1$. On the other hand, when the frequencies f1 and f2 satisfy the relationship f1≤f2, the first vibration system is likely to vibrate due to the second frequency.

Each of the first voltage generating unit 41 and the second voltage generating unit 42 is connected to a control unit 7 and is driven on the basis of signals from the control unit 7. The voltage superimposition unit 43 is connected to the first voltage generating unit 41 and the second voltage generating unit 42.

The voltage superimposition unit 43 includes an adder 43a for applying a voltage to the coil 31. The adder 43a receives the first voltage $V_1$ from the first voltage generating unit 41, receives the second voltage $V_2$ from the second voltage generating unit 42, superimposes the voltages, and applies the superimposed voltage to the coil 31.

Next, a method of driving the optical scanner 1 will be described. In this embodiment, as described above, the frequency of the first voltage $V_1$ is set to be equal to the torsional resonance frequency of the first vibration system and the frequency of the second voltage $V_2$ is set to a value that is different from the torsional resonance frequency of the second vibration system and is less than the frequency of the first voltage $V_1$ (for example, the frequency of the first voltage $V_1$ is set to 18 kHz and the frequency of the second voltage $V_2$ is set to 60 Hz).

For example, the voltage superimposition unit 43 superimposes the first voltage $V_1$ shown in FIG. 4A and the second voltage $V_2$ shown in FIG. 4B and applies the superimposed voltage to the coil 31.

Then, the first voltage $V_1$ causes the magnetic field (this magnetic field is referred to as a "magnetic field A1") for attracting one end (N pole) of the permanent magnet 21 to the coil 31 and for repulsing the other end (S pole) of the permanent magnet 21 from the coil 31 and the magnetic field (this magnetic field is referred to as a "magnetic field A2") for repulsing one end (N pole) of the permanent magnet 21 from the coil 31 and for attracting the other end (S pole) of the permanent magnet 21 to the coil 31 to be alternately switched.

In this embodiment, as described above, the permanent magnet 21 is arranged such that the ends (magnetic poles) thereof are disposed in two regions which are divided by the Y-axis. That is, in the plan view of FIG. 1, the N pole of the permanent magnet 21 is disposed on one side of the Y-axis and the S pole of the permanent magnet 21 is disposed on the other side. Therefore, when the magnetic field A1 and the magnetic field A2 are alternately switched, vibration with a torsional vibration component about the Y-axis is applied to the frame portion 13. With the vibration, the movable mirror portion 11 is rotated about the Y-axis at the frequency of the first voltage $V_1$ while the shaft portions 12a and 12b are being torsionally deformed.

The frequency of the first voltage $V_1$ is equal to the torsional resonance frequency of the first vibration system. Therefore, it is possible to effectively rotate the movable mirror portion 11 about the Y-axis using the first voltage $V_1$. That is, even when vibration with a torsional vibration component about the Y-axis of the frame portion 13 is small, it is possible to increase the rotation angle of the movable mirror portion 11 about the Y-axis associated with the vibration.

The second voltage $V_2$ causes the magnetic field (this magnetic field is referred to as a "magnetic field B1") for attracting one end (N pole) of the permanent magnet 21 to the coil 31 and for repulsing the other end (S pole) of the permanent magnet 21 from the coil 31 and the magnetic field (this magnetic field is referred to as a "magnetic field B2") for repulsing one end (N pole) of the permanent magnet 21 from the coil 31 and for attracting the other end (S pole) of the permanent magnet 21 to the coil 31 to be alternately switched.

In this embodiment, as described above, the permanent magnet 21 is arranged such that the ends (magnetic poles) thereof are disposed in two regions which are divided by the X-axis. In the plan view of FIG. 1, the N pole of the permanent magnet 21 is disposed on one side of the X-axis and the S pole of the permanent magnet 21 is disposed on the other side. Therefore, when the magnetic field B1 and the magnetic field B2 are alternately switched, the frame portion 13 and the movable mirror portion 11 are rotated about the X-axis at the frequency of the second voltage $V_2$ while the shaft portions 14a and 14b and the shaft portions 14c are 14d are being torsionally deformed.

The frequency of the second voltage $V_2$ is set to be significantly less than the frequency of the first voltage $V_1$. In addition, the torsional resonance frequency of the second vibration system is designed to be less than the torsional resonance frequency of the first vibration system. Therefore, it is possible to prevent the movable mirror portion 11 from being rotated about the Y-axis at the frequency of the second voltage $V_2$.

As described above, in the optical scanner 1, since the superimposed voltage of the first voltage $V_1$ and the second voltage $V_2$ is applied to the coil 31, it is possible to rotate the movable mirror portion 11 about the X-axis at the frequency of the second voltage $V_2$ while rotating the movable mirror portion 11 about the Y-axis at the frequency of the first voltage $V_1$. Therefore, the costs and size of the device can be reduced and the movable mirror portion 11 can be rotated about each of the X-axis and the Y-axis by an electromagnetic driving method (moving magnet method). In addition, since the number of components (the permanent magnet and the coil) forming the driving source can be reduced, it is possible to achieve a simple and small structure. Since the coil 31 is separated from the vibration system of the optical scanner 1, it is possible to prevent the adverse effect of heat generated from the coil 31 on the vibration system.

In particular, since the light reflecting plate 113 is separated from the shaft portions 12a and 12b in the thickness direction and overlaps the shaft portions 12a and 12b, as viewed from the thickness direction, it is possible to reduce the size of the optical scanner 1.

Second Embodiment

Next, a second embodiment of the invention will be described.

Figure 5:
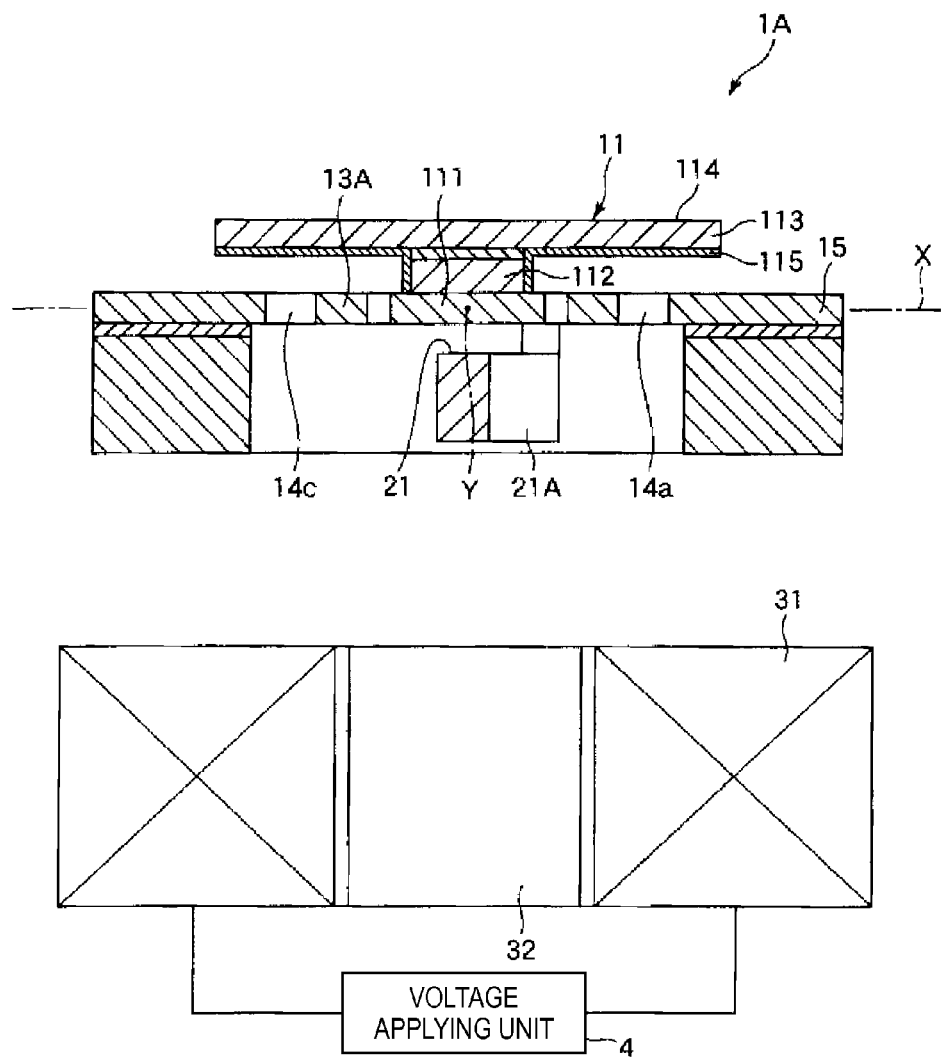
FIG. 5 is a cross-sectional view (a cross-sectional view taken along the X-axis) illustrating an optical scanner (optical device) according to a second embodiment of the invention.

FIG. 5 is a cross-sectional view (a cross-sectional view taken along the X-axis) illustrating an optical scanner (optical device) according to the second embodiment of the invention. Hereinafter, for convenience of explanation, the upper and lower sides of FIG. 5 are referred to as "upper" and "lower" sides.

Hereinafter, the second embodiment will be described with an emphasis on the difference from the first embodiment and the description of the same components as those in the first embodiment will not be repeated. In FIG. 5, the same components as those in the first embodiment are denoted by the same reference numerals.

The optical scanner according to this embodiment is similar to the optical scanner according to the first embodiment except for the structure (shape) of a frame portion and a permanent magnet.

As shown in FIG. 5, an optical scanner 1A according to the second embodiment includes a frame portion 13A and a permanent magnet 21A.

The frame portion 13A has a frame shape and is provided so as to surround a base portion (movable portion) 111 of a movable mirror portion 11.

The frame portion 13A is supported by a supporting portion 15 through shaft portions 14a, 14b, 14c, and 14d. The base portion 111 of the movable mirror portion 11 is supported by the frame portion 13A through shaft portions 12a and 12b.

In this embodiment, the frame portion 13A is formed by a first Si layer of an SOI substrate. Therefore, it is possible to suppress the moment of inertia of the frame portion 13.

The permanent magnet 21A is bonded to the lower surface (the surface opposite to a light reflecting plate 113) of the frame portion 13A.

The permanent magnet 21A is formed in a concave portion of the frame portion 13A. Therefore, it is possible to prevent the contact of the movable mirror portion 11 with the permanent magnet 21A.

According to the optical scanner 1A of the second embodiment, it is also possible to perform two-dimensional scanning with light while reducing the size of a device.

Third Embodiment

Next, a third embodiment of the invention will be described.

Figure 6:
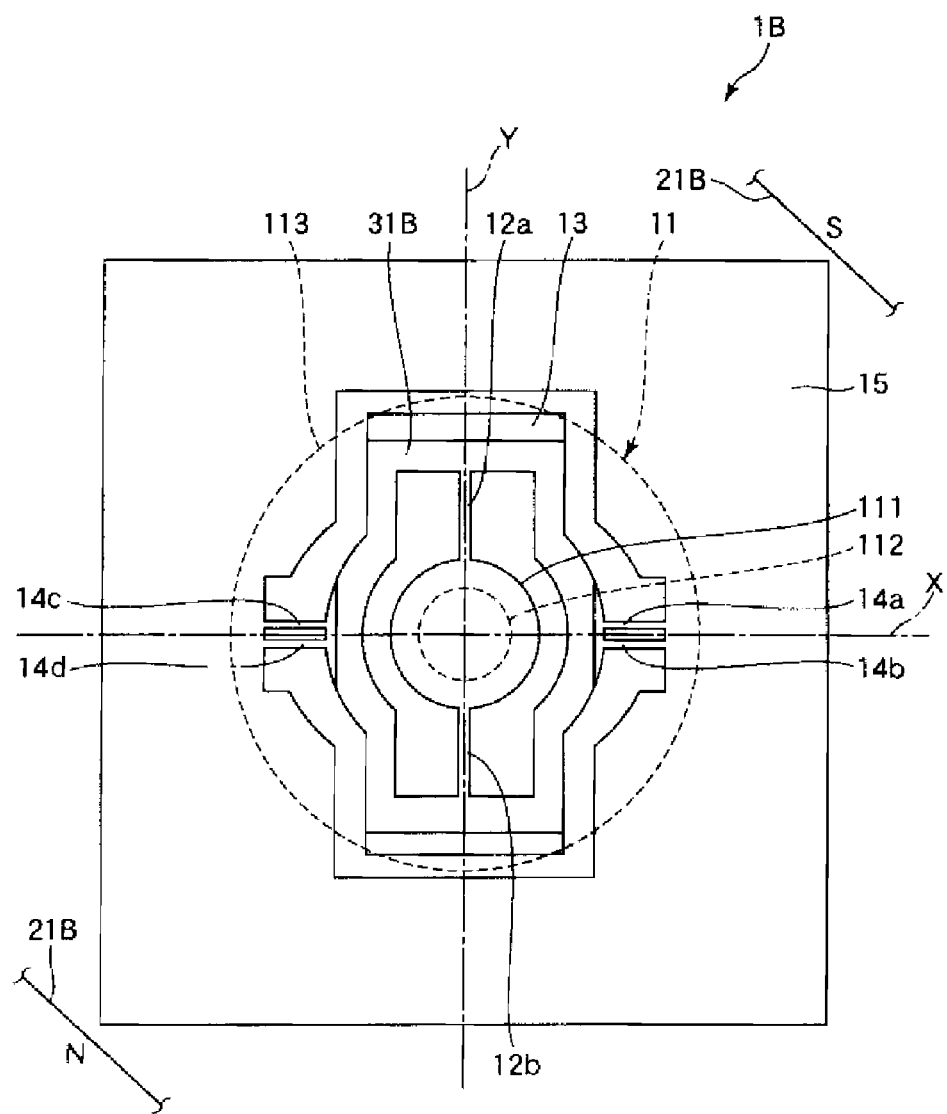
FIG. 6 is a plan view illustrating an optical scanner (optical device) according to a third embodiment of the invention.
Figure 7:
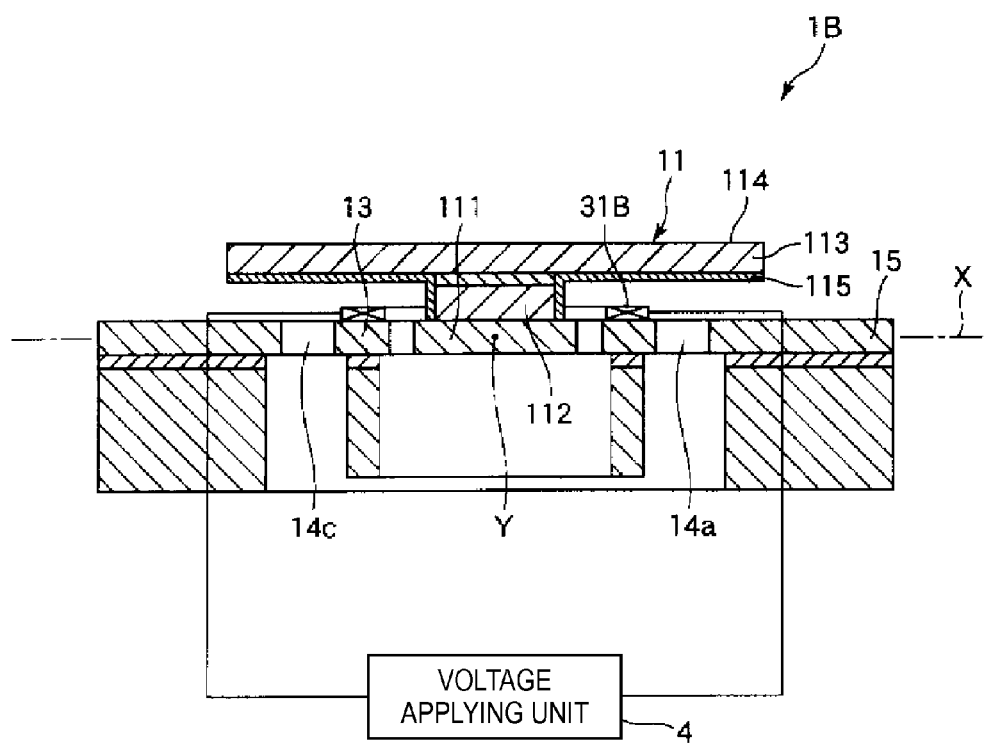
FIG. 7 is a cross-sectional view (a cross-sectional view taken along the X-axis) illustrating the optical scanner shown in FIG. 6.

FIG. 6 is a plan view illustrating an optical scanner (optical device) according to the third embodiment of the invention and FIG. 7 is a cross-sectional view (a cross-sectional view taken along the X-axis) illustrating the optical scanner shown in FIG. 6. Hereinafter, for convenience of explanation, the upper and lower sides of FIG. 7 are referred to as "upper" and "lower" sides.

Hereinafter, the third embodiment will be described with an emphasis on the difference from the first embodiment and the description of the same components as those in the first embodiment will not be repeated. In FIGS. 6 and 7, the same components as those in the first embodiment are denoted by the same reference numerals.

The optical scanner according to this embodiment is similar to the optical scanner according to the first embodiment except that a moving coil method is used.

As shown in FIG. 6, an optical scanner 1B according to third embodiment includes a permanent magnet 21B and a coil 31B.

The coil 31B is provided on the upper surface of a frame portion 13. The coil 31B is bonded to the upper surface of the frame portion 13 while being wound in the circumferential direction of the frame portion 13.

The coil 31B may be formed as follows: a wound coil is bonded to the frame portion 13 by an adhesive; or a coil is patterned in the upper surface of the frame portion 13 by the known film forming method.

The coil 31B is electrically connected a voltage applying unit 4.

The coil 31B may be provided on the lower surface (the surface opposite to a light reflecting plate 113) of the frame portion 13. The coil 31B may be provided on both the upper surface and the lower surface of the frame portion 13.

The permanent magnet 21B has a pair of magnetic poles (the S pole and the N pole) which are opposite to each other with the coil 31B interposed therebetween in a plan view.

The permanent magnet 21B generates the magnetic field in a direction which is inclined with respect to the X-axis and the Y-axis. That is, a line connecting one magnetic pole and the other magnetic pole of the permanent magnet 21B is inclined with respect to the X-axis. The tilt angle of the line with respect to the X-axis is equal to the tilt angle θ in the first embodiment.

The permanent magnet 21B, the coil 31B, and the voltage applying unit 4 form a driving unit which rotates the movable mirror portion 11 about the X-axis and the Y-axis.

That is, when the voltage applying unit 4 applies a voltage to the coil 31B, the movable mirror portion 11 is rotated about the X-axis and the Y-axis by the interaction between the coil 31B and the magnetic field of the permanent magnet 21B. Therefore, it is possible to rotate the movable mirror portion 11 about the X-axis and the Y-axis using an electromagnetic driving method (moving coil method) while reducing the size of a device.

According to the optical scanner 1B of the third embodiment, it is also possible to perform two-dimensional scanning with light while reducing the size of a device.

Fourth Embodiment

Next, a fourth embodiment of the invention will be described.

Figure 8:
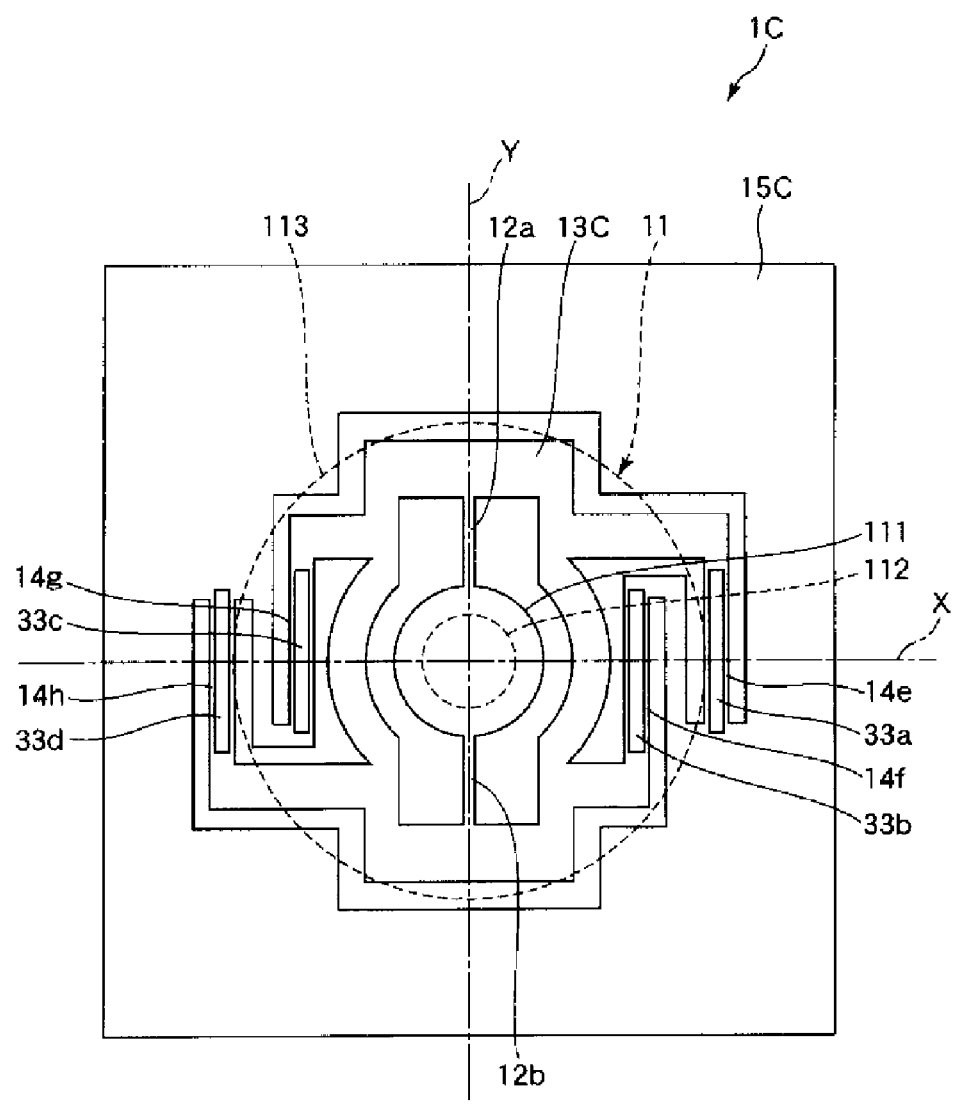
FIG. 8 is a plan view illustrating an optical scanner (optical device) according to a fourth embodiment of the invention.
Figure 9:
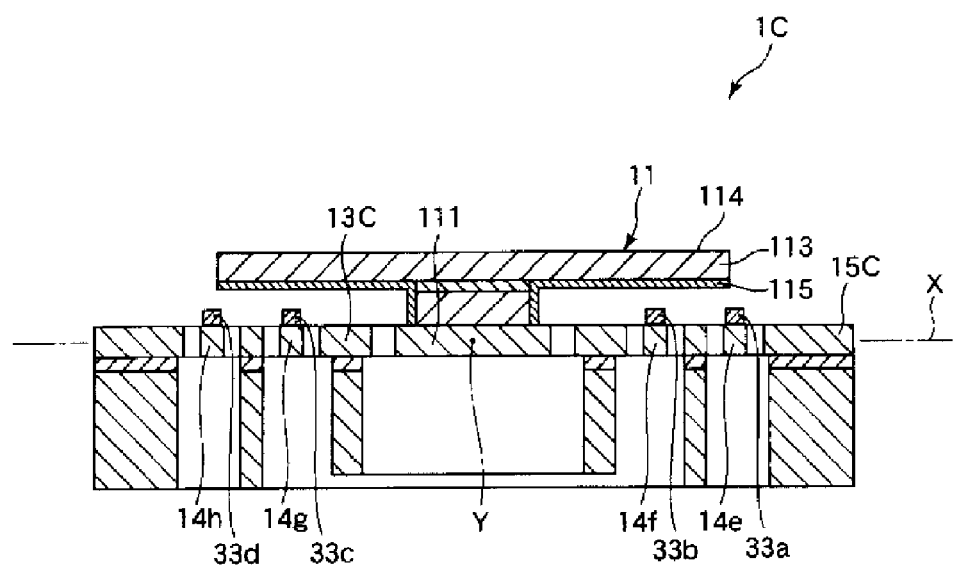
FIG. 9 is a cross-sectional view (a cross-sectional view taken along the X-axis) illustrating the optical scanner shown in FIG. 8.
Figure 10:
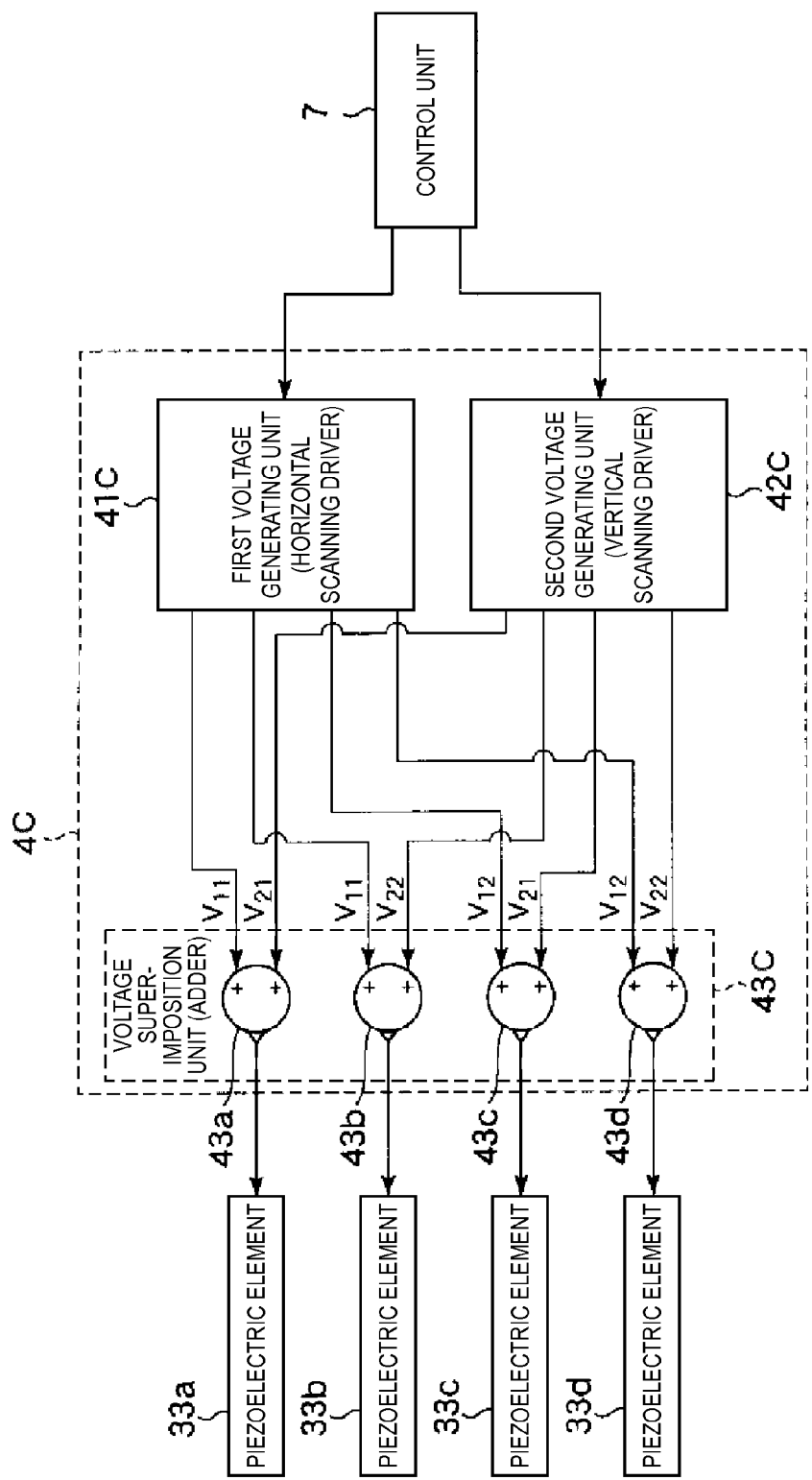
FIG. 10 is a block diagram illustrating a voltage applying unit of a driving unit included in the optical scanner shown in FIG. 8.

FIG. 8 is a plan view illustrating an optical scanner (optical device) according to the fourth embodiment of the invention. FIG. 9 is a cross-sectional view illustrating the optical scanner shown in FIG. 8 (a cross-sectional view taken along the X-axis). FIG. 10 is a block diagram illustrating a voltage applying unit of a driving unit included in the optical scanner shown in FIG. 8. FIGS. 11A to 11D are diagrams illustrating examples of voltages generated by a first voltage generating unit and a second voltage generating unit shown in FIG. 10. Hereinafter, for convenience of explanation, the upper and lower sides of FIG. 9 are referred to as "upper" and "lower" sides.

Hereinafter, the fourth embodiment will be described with an emphasis on the difference from the first embodiment and the description of the same components as those in the first embodiment will not be repeated. In FIGS. 8 to 10, the same components as those in the first embodiment are denoted by the same reference numerals.

The optical scanner according to this embodiment is similar to the optical scanner according to the first embodiment except that a piezoelectric driving method is used.

As shown in FIG. 8, an optical scanner 1C according to the fourth embodiment includes a frame portion 13C, a four (two pairs of) shaft portions 14e, 14f, 14g, and 14h (second shaft portions), a supporting portion 15C, and four (two pairs of) piezoelectric elements 33a, 33b, 33c, and 33d.

The frame portion 13C has a frame shape and is provided so as to surround a base portion (movable portion) 111 of a movable mirror portion 11.

The frame portion 13C is supported by the supporting portion 15C through the shaft portions 14e, 14f, 14g, and 14h. The base portion 111 of the movable mirror portion 11 is supported by the frame portion 13C through the shaft portions 12a and 12b.

For the two pairs of shaft portions (beams) 14e, 14f, 14g, and 14h, a pair of shaft portions 14e and 14f are provided on one side of the frame portion 13C and a pair of shaft portions 14g and 14h are provided on the other side thereof.

The shaft portions 14e, 14f, 14g, and 14h are provided so as to be symmetric with respect to the center of the frame portion 13C in a plan view.

The supporting portion 15C is formed so as to surround the outer circumference of the frame portion 13C.

The pair of shaft portions 14e and 14f are connected to the frame portion 13C and the supporting portion 15C, respectively. Similarly, the pair of shaft portions 14g and 14h are connected to the frame portion 13C and the supporting portion 15C, respectively.

Each of the shaft portions 14e, 14f, 14g, and 14h can be elastically deformed, has a longitudinal shape, and extends in parallel to the Y-axis. For the two pairs of shaft portions 14e, 14f, 14g, and 14h, the shaft portions 14e and 14g and the shaft portions 14f and 14h are bent in the opposite direction to rotate the frame portion 13C about the X-axis. In addition, the shaft portions 14e and 14f and the shaft portions 14g and 14h are bent in the opposite direction to rotate the frame portion 13C about the Y-axis.

In order to rotate the frame portion 13C about the X-axis and the Y-axis in this way, a piezoelectric element 33a is provided on the shaft portion 14e, a piezoelectric element 33b is provided on the shaft portion 14f, a piezoelectric element 33c is provided on the shaft portion 14g, and a piezoelectric element 33d is provided on the shaft portion 14h.

Next, the piezoelectric elements 33a and 33b will be described in detail as a representative example. The piezoelectric elements 33c and 33d have the same structure as the piezoelectric elements 33a and 33b.

The piezoelectric element 33a is bonded to the upper surface of the shaft portion 14e and is configured so as to be expanded and contracted in the longitudinal direction of the shaft portion 14e. In this way, the piezoelectric element 33a is expanded and contracted to bend the shaft portion 14e in the vertical direction. The piezoelectric element 33b is bonded to the upper surface of the shaft portion 14f and is configured so as to be expanded and contracted in the longitudinal direction of the shaft portion 14f. In this way, the piezoelectric element 33b is expanded and contracted to bend the shaft portion 14f in the vertical direction.

In other words, the piezoelectric element 33a is elongated in the longitudinal direction of the shaft portion 14e and is expanded and contracted in the elongated direction to bend the shaft portion 14e. In this way, the piezoelectric element 33a can be used to reliably bend the shaft portion 14e with a relatively simple structure. Similarly, the piezoelectric element 33b is elongated in the longitudinal direction of the shaft portion 14f and is expanded and contracted in the elongated direction to bend the shaft portion 14f. In this way, the piezoelectric element 33b can be used to reliably bend the shaft portion 14f with a relatively simple structure.

Each of the piezoelectric elements 33a and 33b includes, for example, a piezoelectric layer made of a piezoelectric material as a main material and a pair of electrodes having the piezoelectric layer interposed therebetween, which are not shown in the drawings.

Examples of the piezoelectric material include zinc oxide, aluminum nitride, lithium tantalate, lithium niobate, potassium niobate, lead zirconate titanate (PZT), barium titanate, and various other materials. A combination of one or two or more kinds of materials among them may be used. In particular, it is preferable that at least one of zinc oxide, aluminum nitride, lithium tantalate, lithium niobate, potassium niobate, and lead zirconate titanate be used as the main material. When the piezoelectric layers of the piezoelectric elements 33a and 33b are made of these materials, it is possible to drive the optical scanner 1C with a high frequency.

The piezoelectric element 33a is provided so as to cover substantially the entire upper surface of the shaft portion 14e. Therefore, the piezoelectric element 33a is provided substantially over the entire region of the shaft portion 14e in the longitudinal direction. In this way, the amount of bending of the shaft portion 14e can be increased by the operation of the piezoelectric element 33a. Similarly, the piezoelectric element 33b is provided so as to cover substantially the entire upper surface of the shaft portion 14f. Therefore, the piezoelectric element 33b is provided substantially over the entire region of the shaft portion 14f in the longitudinal direction. In this way, the amount of bending of the shaft portion 14f can be increased by the operation of the piezoelectric element 33b.

As such, the piezoelectric elements 33a and 33b are all provided on the upper surface. Therefore, when the piezoelectric elements 33a and 33b operate such that one of the piezoelectric elements 33a and 33b is expanded and the other piezoelectric element is contracted, a pair of shaft portions 14e and 14f can be bent in the opposite direction.

The piezoelectric elements 33c and 33d have the same structure as the piezoelectric elements 33a and 33b. Similar to the piezoelectric elements 33a and 33b, the piezoelectric elements 33c and 33d are all provided on the upper surface. Therefore, when the piezoelectric elements 33c and 33d operate such that one of the piezoelectric elements 33a and 33b is expanded and the other piezoelectric element is contracted, a pair of shaft portions 14g and 14h can be bent in the opposite direction.

The piezoelectric elements 33a, 33b, 33c, and 33d are connected to a voltage applying unit 4C, which will be described below, through wiring lines (not shown).

As shown in FIG. 10, the voltage applying unit 4C includes a first voltage generating unit 41C that generates a first voltage for rotating the movable mirror portion 11 about the Y-axis, a second voltage generating unit 42C that generates a second voltage for rotating the movable mirror portion 11 about the X-axis, and a voltage superimposition unit 43C that superimposes the first voltage and the second voltage and applies the superimposed voltage to the piezoelectric elements 33a, 33b, 33c, and 33d.

The first voltage generating unit 41C generates a voltage (horizontal scanning voltage) which is periodically changed with a period $T_1$, as shown on the right side of FIGS. 11A to 11D. That is, the first voltage generating unit 41C generates two kinds of first voltages $V_{11}$ and $V_{12}$ which are periodically changed at a first frequency ($1/T_1$).

Figure 11A:
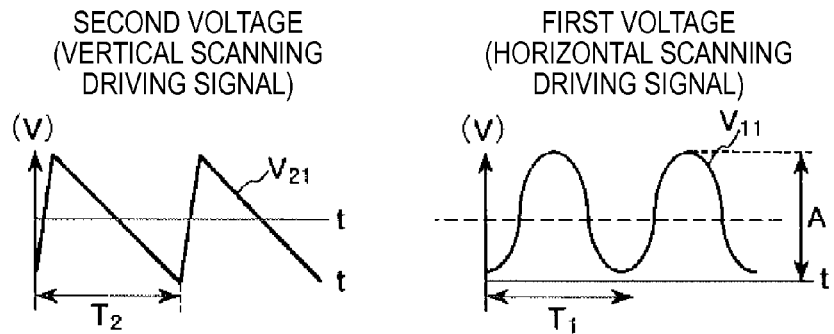
FIGS. 11A to 11D are diagrams illustrating examples of voltages generated by a first voltage generating unit and a second voltage generating unit shown in FIG. 10.
Figure 11B:
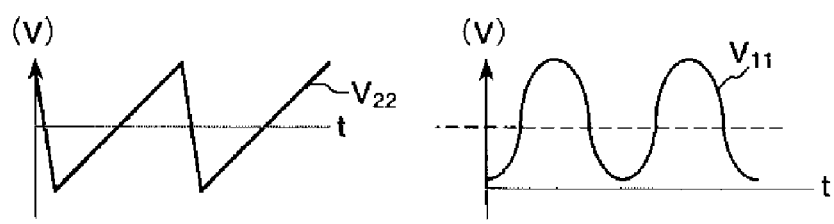

Specifically, the first voltage generating unit 41C generates the first voltage $V_{11}$ which is periodically changed with the period $T_1$ as the horizontal scanning voltage (horizontal scanning driving signal) to be applied to the piezoelectric elements 33a and 33b, as shown on the right side of FIGS. 11A and 11B.

The first voltage $V_{11}$ has the waveform of a sine wave. Therefore, the optical scanner 1C can effectively perform main scanning with light. The waveform of the first voltage $V_{11}$ is not limited thereto.

The first frequency ($1/T_1$) is not particularly limited as long as it is suitable for horizontal scanning. However, it is preferable that the first frequency be in the range of 10 kHz to 40 kHz. In addition, it is preferable that the first frequency be set to be substantially equal to the torsional resonance frequency of a vibration system including the movable mirror portion 11 and the shaft portions 12a and 12b. That is, it is preferable that the torsional resonance frequency of the vibration system be set to be suitable for horizontal scanning.

Figure 11C:
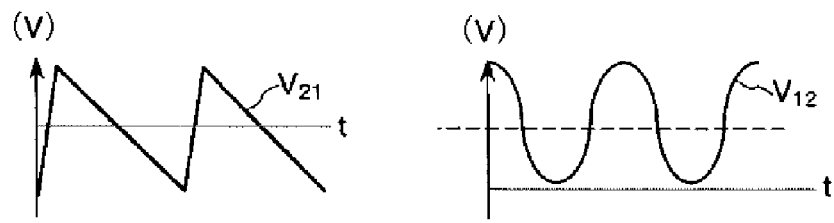
Figure 11D:
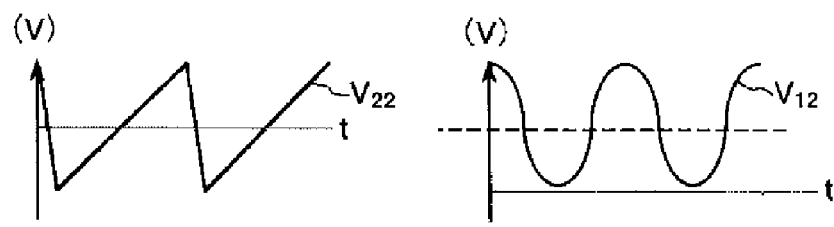

The first voltage generating unit 41C generates the first voltage $V_{12}$ which is periodically changed with the period $T_1$ as the horizontal scanning voltage (horizontal scanning driving signal) to be applied to the piezoelectric elements 33c and 33d, as shown on the right side of FIGS. 11C and 11D. The first voltage $V_{12}$ has the same waveform as the first voltage $V_{11}$ and the phase difference between the first voltages $V_{11}$ and $V_{12}$ is 180°.

The second voltage generating unit 42C generates a voltage (vertical scanning voltage) which is periodically changed with a period $T_2$ different from the period $T_1$, as shown on the left side of FIGS. 11A to 11D. That is, the second voltage generating unit 42C generates two kinds of second voltages $V_{21}$ and $V_{22}$ which are periodically changed at a second frequency ($1/T_2$) different from the first frequency ($1/T_1$).

Specifically, the second voltage generating unit 42C generates the second voltage $V_{21}$ which is periodically changed with a period $T_2$ different from the period $T_1$ as the vertical scanning voltage (vertical scanning driving signal) to be applied to the piezoelectric elements 33a and 33c, as shown on the left side of FIGS. 11A and 11C.

The second voltage $V_{21}$ has the waveform of a sawtooth wave. Therefore, the optical scanner 1C can effectively perform sub-scanning with light. The waveform of the second voltage $V_{21}$ is not limited thereto.

The second frequency ($1/T_2$) is different from the first frequency ($1/T_1$) and is not particularly limited as long as it is suitable for vertical scanning. However, it is preferable that the second frequency be less than the first frequency ($1/T_1$). That is, it is preferable that the period $T_2$ be longer than the period $T_1$.

It is preferable that the second frequency ($1/T_2$) be in the range of 40 Hz to 80 Hz (about 60 Hz). In this case, it is possible to rotate the movable mirror portion 11 about two axes (the X-axis and the Y-axis) perpendicular to each other at a frequency which is suitable to draw an image in the display.

The second voltage generating unit 42C generates the second voltage $V_{22}$ which is periodically changed with the period $T_2$ as the vertical scanning voltage (vertical scanning driving signal) to be applied to the piezoelectric elements 33b and 33d, as shown on the left side of FIGS. 11B and 11D. The second voltage $V_{22}$ has the same waveform as that obtained by reversing the second voltage $V_{21}$ with respect to a given reference voltage.

The first voltage generating unit 41C and the second voltage generating unit 42C are connected to a control unit 7 and are driven on the basis of signals from the control unit 7.

The voltage superimposition unit 43C is connected to the first voltage generating unit 41C and the second voltage generating unit 42C. The voltage superimposition unit 43C includes an adder 43a for applying a voltage to the piezoelectric element 33a, an adder 43b for applying a voltage to the piezoelectric element 33b, an adder 43c for applying a voltage to the piezoelectric element 33c, and an adder 43d for applying a voltage to the piezoelectric element 33d.

The adder 43a receives the first voltage $V_{11}$ from the first voltage generating unit 41C, receives the second voltage $V_{21}$ from the second voltage generating unit 42C, superimposes these voltages, and applies the superimposed voltage to the piezoelectric element 33a.

The adder 43b receives the first voltage $V_{11}$ from the first voltage generating unit 41C, receives the second voltage $V_{22}$ from the second voltage generating unit 42C, superimposes these voltages, and applies the superimposed voltage to the piezoelectric element 33b.

The adder 43c receives the first voltage $V_{12}$ from the first voltage generating unit 41C, receives the second voltage $V_{21}$ from the second voltage generating unit 42C, superimposes these voltages, and applies the superimposed voltage to the piezoelectric element 33c.

The adder 43d receives the first voltage $V_{12}$ from the first voltage generating unit 41C, receives the second voltage $V_{22}$ from the second voltage generating unit 42C, superimposes these voltages, and applies the superimposed voltage to the piezoelectric element 33d.

The optical scanner 1C having the above-mentioned structure is driven as follows.

For example, the voltages $V_{11}$ and $V_{21}$ shown in FIG. 11A are superimposed and the superimposed voltage is applied to the piezoelectric element 33a. In addition, the voltages $V_{11}$ and $V_{22}$ shown in FIG. 11B are superimposed and the superimposed voltage is applied to the piezoelectric element 33b.

In synchronization with the application operation, the voltages $V_{22}$ and $V_{22}$ shown in FIG. 11C are superimposed and the superimposed voltage is applied to the piezoelectric element 33c. In addition, the voltages $V_{22}$ and $V_{22}$ shown in FIG. 11D are superimposed and the superimposed voltage is applied to the piezoelectric element 33d.

Then, a state in which the piezoelectric elements 33a and 33c are expanded and the piezoelectric elements 33b and 33d are contracted and a state in which the piezoelectric elements 33a and 33c are contracted and the piezoelectric elements 33b and 33d are expanded are alternately repeated at the second frequency ($1/T_2$) while a state in which the piezoelectric elements 33a and 33b are expanded and the piezoelectric elements 33c and 33d are contracted and a state in which the piezoelectric elements 33a and 33b are contracted and the piezoelectric elements 33c and 33d are expanded are alternately repeated at the first frequency ($1/T_1$).

In other words, the piezoelectric elements 33a and 33b and the piezoelectric elements 33c and 33d are expanded in the opposite direction at the first frequency ($1/T_1$) while the ratio of the expandable range (displaceable length) of the piezoelectric elements 33b and 33d to the expandable range (displaceable length) of the piezoelectric elements 33a and 33c is changed at the second frequency ($1/T_2$).

When the piezoelectric elements 33a to 33d operate in this way, each of the shaft portions 14e, 14f, 14g, and 14h is mainly bent and the frame portion 13C is rotated about the X-axis at the second frequency ($1/T_2$) while being rotated about the Y-axis at the first frequency ($1/T_1$).

As such, when the voltage applying unit 4C applies to the voltages to the piezoelectric elements 33a, 33b, 33c, and 33d, the movable mirror portion 11 is rotated about the X-axis at the second frequency ($1/T_2$) while being rotated about the Y-axis at the first frequency ($1/T_1$).

Therefore, it is possible to rotate the movable mirror portion 11 about the X-axis and the Y-axis using the piezoelectric driving method while reducing the size of a device.

The aspect of the piezoelectric-driving-type optical scanner is not limited to the above. For example, each of the piezoelectric elements 33a, 33b, 33c, and 33d may have a shape in which it is expanded and contracted such that each of the shaft portions 14e, 14f, 14g, and 14h can be bent, or it may have a trapezoidal shape in a plan view. The frame portion 13C and the supporting portion 15C may be connected to each other by the shaft portions 14e, 14f, 14g, and 14h such that the frame portion 13C can be rotated about the Y-axis while being rotated about the X-axis by the bending of each of the shaft portions 14e, 14f, 14g, and 14h.

According to the optical scanner 1C of the fourth embodiment, it is also possible to perform two-dimensional scanning with light while reducing the size of a device.

Fifth Embodiment

Next, a fifth embodiment of the invention will be described.

Figure 12:
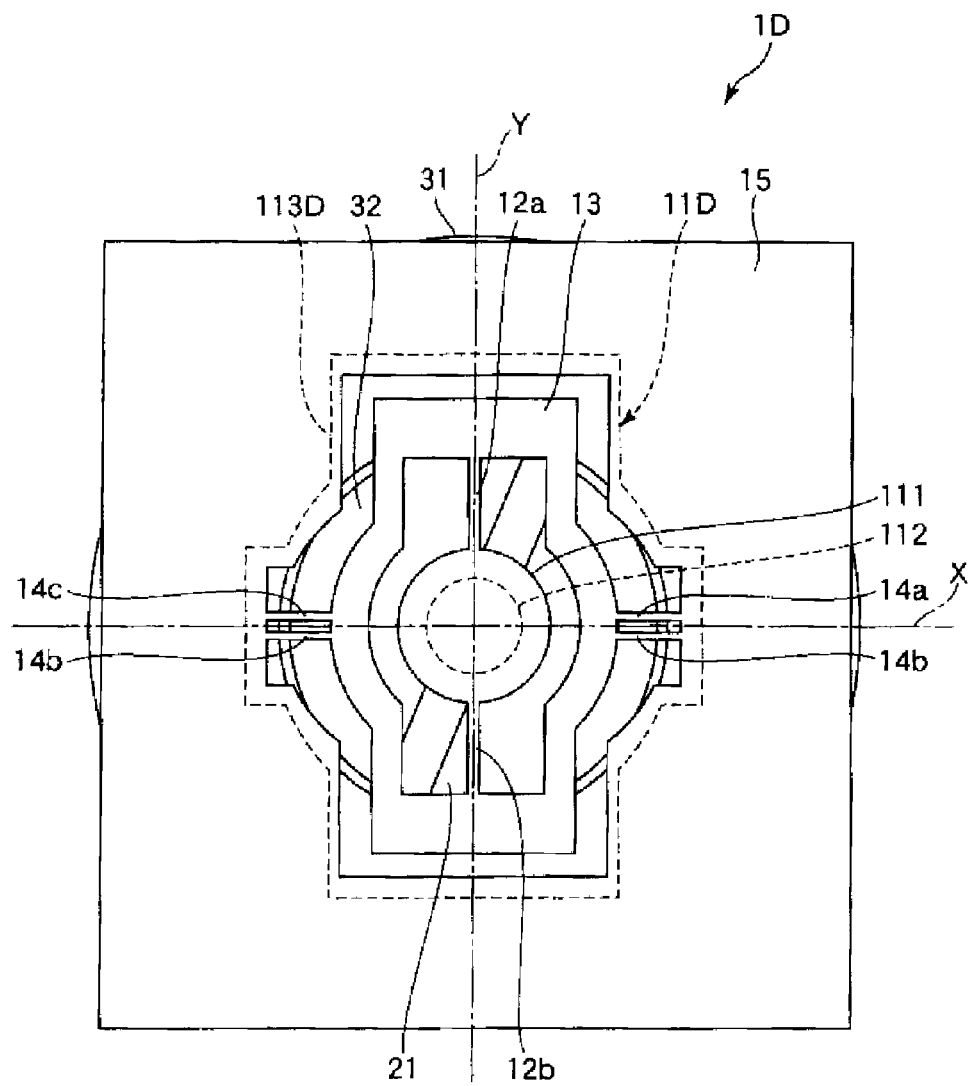
FIG. 12 is a plan view illustrating an optical scanner (optical device) according to a fifth embodiment of the invention.

FIG. 12 is a plan view illustrating an optical scanner (optical device) according to the fifth embodiment of the invention.

Hereinafter, the fifth embodiment will be described with an emphasis on the difference from the first embodiment and the description of the same components as those in the first embodiment will not be repeated. In FIG. 12, the same components as those in the above-described embodiments are denoted by the same reference numerals.

The optical scanner according to this embodiment is similar to the optical scanner according to the first embodiment except for the shape of the light reflecting plate 113 in a plan view.

As shown in FIG. 12, an optical scanner 1D according to the fifth embodiment includes a movable mirror portion 11D.

The movable mirror portion 11D includes a base portion (movable portion) 111 and a light reflecting plate 113D which is fixed to the base portion 111 through a spacer 112.

The light reflecting plate 113D has a shape including a portion which protrudes toward the outside in the directions along both the X-axis and the Y-axis in a plan view. In other words, the light reflecting plate 113D has a substantially cross shape in a plan view. In this way, it is possible to provide the light reflecting plate 113D so as to cover shaft portions 12a and 12b, a frame portion 13, or shaft portions 14a, 14b, 14c, and 14d in a plan view while suppressing the moment of inertia of the light reflecting plate 113D about the X-axis and the Y-axis.

According to the optical scanner 1D of the fifth embodiment, it is also possible to perform two-dimensional scanning with light while reducing the size of a device.

Each of the above-mentioned optical scanners 1 to 1D can be appropriately applied to optical scanners of image display devices such as imaging displays including a projector, a head-up display (HUD), and a head-mounted display (HMD).

Image Display Device According to Embodiment

Figure 13:
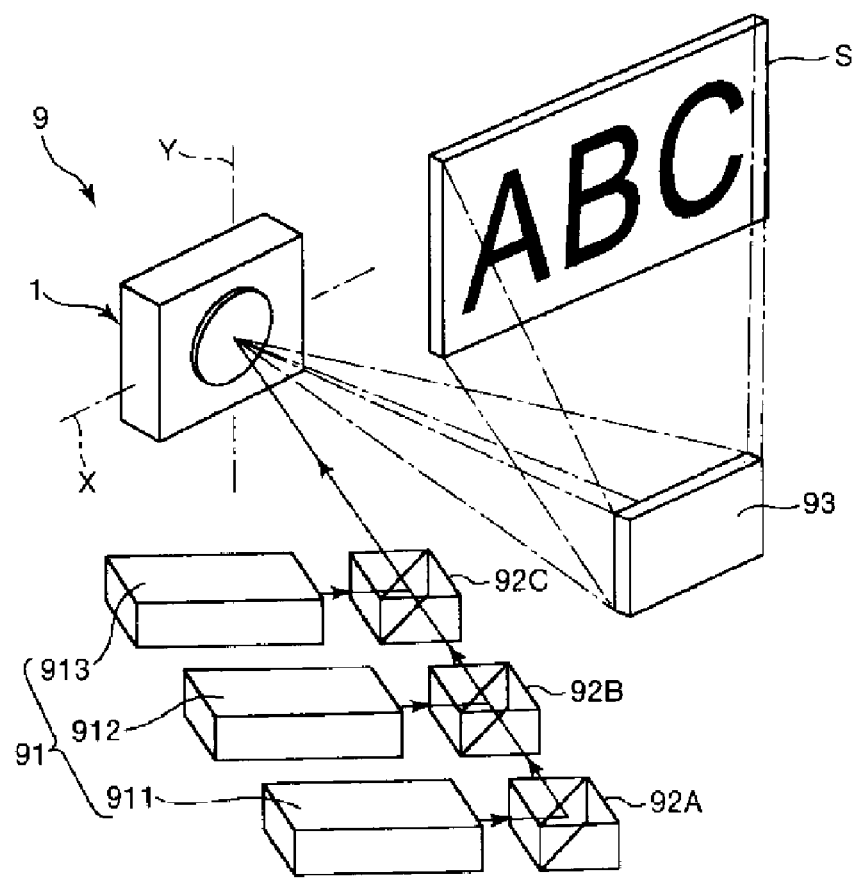
FIG. 13 is a diagram schematically illustrating an image display device according to an embodiment of the invention.

FIG. 13 is a diagram schematically illustrating an image display device according to an embodiment of the invention.

In this embodiment, a case in which the optical scanner 1 is used as an optical scanner of an imaging display which is an example of an image display device will be described. The lengthwise direction of a screen S is referred to a "lateral direction" and a direction perpendicular to the lengthwise direction is referred to as a "longitudinal direction". In addition, the X-axis is parallel to the lateral direction of the screen S and the Y-axis is parallel to the longitudinal direction of the screen S.

An image display device (projector) 9 includes a light source device (light source) 91 that emits light, such as a laser beam, a plurality of dichroic mirrors 92A, 92B, and 92C, and the optical scanner 1.

The light source device 91 includes a red light source device 911 that emits red light, a blue light source device 912 that emits blue light, and a green light source device 913 that emits green light.

The dichroic mirrors 92A, 92B, and 92C are optical elements that compose light components emitted from the red light source device 911, the blue light source device 912, and the green light source device 913.

The image display device 9 is formed such that the dichroic mirrors 92A, 92B, and 92C compose light emitted from the light source device 91 (the red light source device 911, the blue light source device 912, and the green light source device 913) on the basis of image information from a host computer (not shown), the optical scanner 1 performs two-dimensional scanning with the composed light, and a color image is formed on the screen S.

During two-dimensional scanning, the screen S is scanned in the lateral direction with light which is reflected from the light reflecting portion 114 by the rotation of the movable mirror portion 11 of the optical scanner 1 about the Y-axis (main scanning). On the other hand, the screen S is scanned in the longitudinal direction with light which is reflected from the light reflecting portion 114 by the rotation of the movable mirror portion 11 of the optical scanner 1 about the X-axis (sub-scanning).

In FIG. 13, after the optical scanner 1 performs two-dimensional scanning with light which is composed by the dichroic mirrors 92A, 92B, and 92C, the light is reflected from a fixed mirror 93 and an image is formed on the screen S. However, the fixed mirror 93 may be omitted and light which is used by the optical scanner 1 to perform two-dimensional scanning may be directly emitted to the screen S.

Next, application examples of the image display device will be described.

Application Example 1 of Image Display Device

Figure 14:
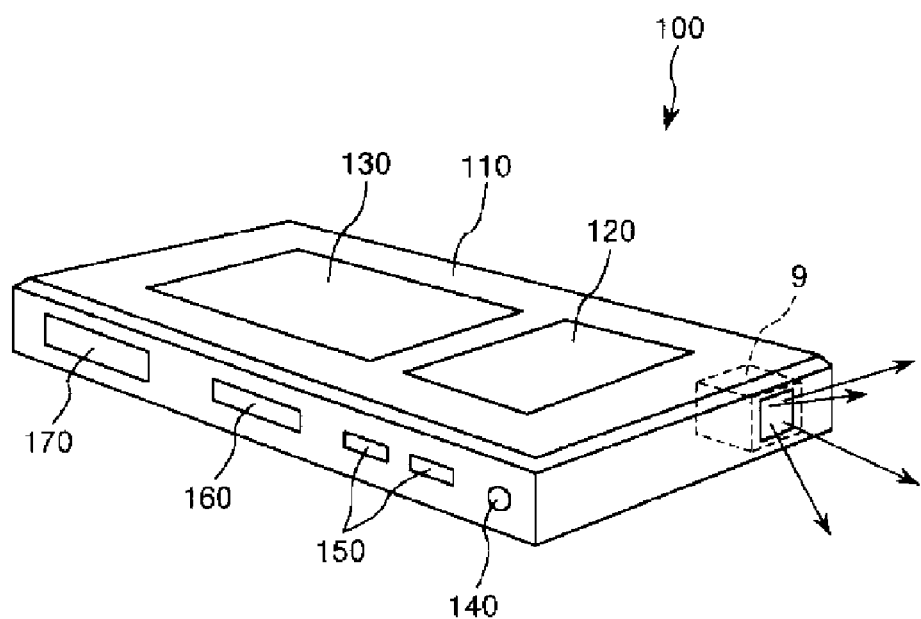
FIG. 14 is a perspective view illustrating Application Example 1 of the image display device according to the invention.

FIG. 14 is a perspective view illustrating Application Example 1 of the image display device according to the invention.

As shown in FIG. 14, the image display device 9 can be applied to a portable image display apparatus 100.

The portable image display apparatus 100 includes a casing 110 with dimensions which enables the user to hold the casing 110 with hand and the image display device 9 which is provided in the casing 110. It is possible to display a predetermined image on a predetermined surface, such as a screen or a desk, using the portable image display apparatus 100.

The portable image display apparatus 100 includes a display 120 which displays predetermined information, a keypad 130, an audio port 140, control buttons 150, a card slot 160, and an AV port 170.

The portable image display apparatus 100 may have other functions such as a communication function and a GPS reception function.

Application Example 2 of Image Display Device

Figure 15:
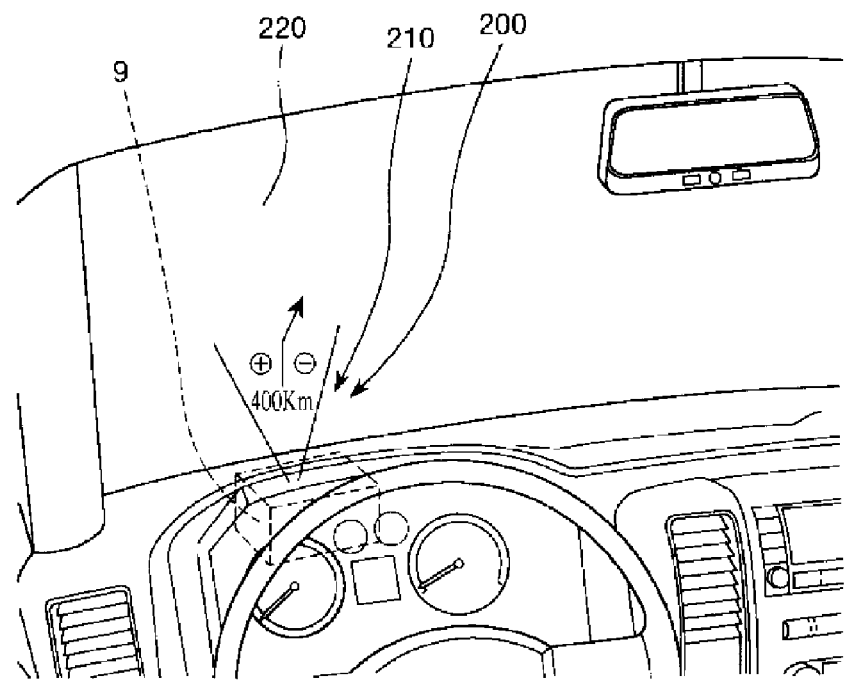
FIG. 15 is a perspective view illustrating Application Example 2 of the image display device according to the invention.

FIG. 15 is a perspective view illustrating Application Example 2 of the image display device according to the invention.

As shown in FIG. 15, the image display device 9 can be applied to a head-up display system 200.

In the head-up display system 200, the image display device 9 is provided in a dashboard of a vehicle so as to form a head-up display 210. The head-up display 210 can display a predetermined image, such as the image of a route to the destination, on a front glass 220.

The application of the head-up display system 200 is not limited to the vehicle, but the head-up display system 200 may be applied to, for example, airplanes and ships.

Application Example 3 of Image Display Device

Figure 16:
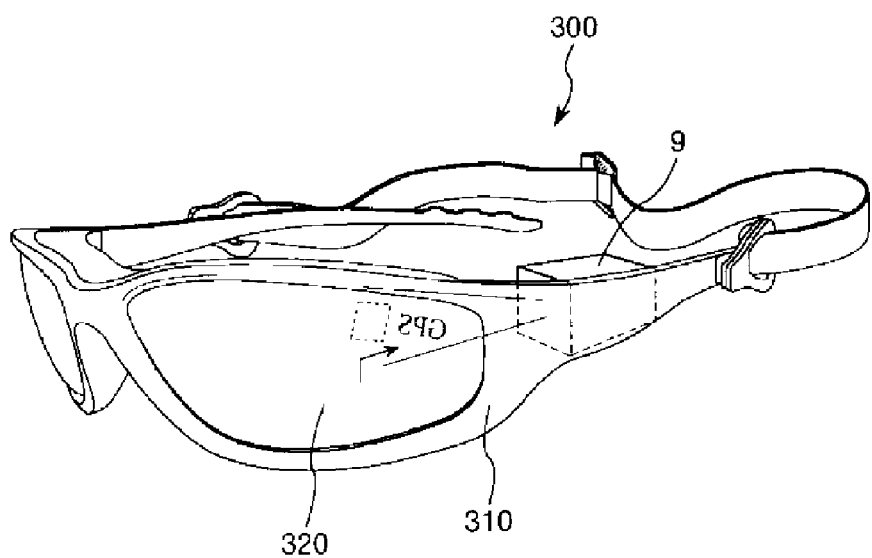
FIG. 16 is a perspective view illustrating Application Example 3 of the image display device according to the invention.

FIG. 16 is a perspective view illustrating Application Example 3 of the image display device according to the invention.

As shown in FIG. 16, the image display device 9 can be applied to a head-mounted display 300.

That is, the head-mounted display 300 includes glasses 310 and the image display device 9 provided in the glasses 310. The image display device 9 displays a predetermined image which is viewed by one eye on a display unit 320 which is provided in a portion of the glasses 310 corresponding to the original lens.

The display unit 320 may be transparent or opaque. When the display unit 320 is transparent, information from the image display device 9 may be added to information from the real world and the added information may be used.

The head-mounted display 300 may be provided with two image display devices 9 and images which are viewed by both eyes may be displayed on two display units.

The optical devices, the optical scanners, and the image display devices according to the invention have been described above with reference to the shown embodiments, but the invention is not limited thereto. For example, in the optical devices, the optical scanners, and the image display devices according to the embodiments of the invention, the structure of each unit may be replaced with any structure with the same function and any other structures may be added.

In the above-described embodiments of the invention, two or more arbitrary structures (features) may be combined with each other.

In the above-described embodiments, two (a pair of) first shaft portions are provided, but the invention is not limited thereto. For example, four or more (two or more pairs of) first shaft portions may be provided.

In the above-described embodiments, four (two pairs of) second shaft portions are provided, but the invention is not limited thereto. For example, two (a pair of) second shaft portions or six or more (three or more pairs of) second shaft portions may be provided.

In the above-described embodiments, the light reflecting plate covers the entire first shaft portion, the entire frame portion, and the entire second shaft portion in a plan view. However, the light reflecting plate may cover at least a part of the first shaft portion (the base-side end of the movable mirror portion) in a plan view. In this case, as described above, it is possible to reduce the size of the optical device, increase the area of the light reflecting plate, prevent the warping of the light reflecting plate, and prevent the generation of stray light due to the base-side end of the first shaft portion.

In the above-described embodiments, the SOI substrate is processed to form the light reflecting plate and the spacer. However, the invention is not limited thereto. For example, the light reflecting plate and the spacer may be formed from a separate substrate.

In addition, the spacer between the light reflecting plate and the base portion may be a soldering ball. In this case, for example, metal films may be formed on the spacer-side surfaces of the light reflecting plate and the base portion and the metal films may be bonded to each other by the soldering ball.

In the above-described embodiments, the optical device according to the invention is applied to the optical scanner. However, the invention is not limited thereto. For example, the optical device according to the embodiments of the invention may be applied to other optical devices such as a light switch and an optical attenuator.

The entire disclosure of Japanese Patent Application No. 2012-109007, filed May 11, 2012 is expressly incorporated by reference herein.

What is claimed is:
1. An optical device comprising:
a movable portion that is rotatable about a first axis;
a frame portion that is rotatable about a second axis intersecting the first axis;
a first shaft portion that supports the movable portion so as to be rotatable about the first axis with respect to the frame portion; and
a light reflecting plate that is fixed to the movable portion and includes a light reflecting portion with a light reflecting property,
wherein the frame portion is provided so as to surround the movable portion,
the first shaft portion includes one end connected to the movable portion and the other end connected to the frame portion, and
the light reflecting plate is separated from the first shaft portion in a thickness direction of the light reflecting plate and overlaps at least a part of the first shaft portion, as viewed from the thickness direction.
2. The optical device according to claim 1,
wherein the light reflecting plate covers the entire first shaft portion, as viewed from the thickness direction.

3. The optical device according to claim 2,
wherein the light reflecting plate covers the entire frame portion, as viewed from the thickness direction.

4. The optical device according to claim 3, further comprising:
a second shaft portion that is connected to the frame portion and supports the frame portion so as to be rotatable about the second axis,
wherein the light reflecting plate covers the entire second shaft portion, as viewed from the thickness direction.

5. The optical device according to claim 2,
wherein the light reflecting plate has a shape including a portion that protrudes in a direction along at least one of the first axis and the second axis, as viewed from the thickness direction.

6. The optical device according to claim 1,
wherein the light reflecting plate is fixed to the movable portion through a spacer.

7. The optical device according to claim 1,
wherein a hard layer which is made of a material harder than that forming the light reflecting plate is formed in at least a portion of a surface of the light reflecting plate close to the movable portion.

8. The optical device according to claim 1, further comprising:
a permanent magnet that is provided in the frame portion;
a coil that is provided so as to face the frame portion; and
a voltage applying unit that applies a voltage to the coil,
wherein the voltage applying unit applies the voltage to the coil to rotate the movable portion about the first axis and the second axis.

9. The optical device according to claim 1, further comprising:
a coil that is provided in the frame portion;
a permanent magnet that is provided so as to face the frame portion; and
a voltage applying unit that applies a voltage to the coil,
wherein the voltage applying unit applies the voltage to the coil to rotate the movable portion about the first axis and the second axis.

10. The optical device according to claim 1, further comprising:
a piezoelectric element that is provided in the second shaft portion; and
a voltage applying unit that applies a voltage to the piezoelectric element,
wherein the voltage applying unit applies the voltage to the piezoelectric element to rotate the movable portion about the first axis and the second axis.

11. The optical device according to claim 8,
wherein the voltage applying unit includes:
a first voltage generating unit that generates a first voltage with a first frequency;
a second voltage generating unit that generates a second voltage with a second frequency different from the first frequency; and
a voltage superimposition unit that superimposes the first voltage and the second voltage, and
the voltage applying unit rotates the movable portion about the first axis at the first frequency and rotates the movable portion about the second axis at the second frequency.

12. The optical device according to claim 1,
wherein, when the length of the frame portion in a direction along the first axis is a and the length of the frame portion in a direction along the second axis is b, a>b is satisfied.

13. An optical scanner comprising:
a movable portion that is rotatable about a first axis;
a frame portion that is rotatable about a second axis intersecting the first axis;
a first shaft portion that supports the movable portion so as to be rotatable about the first axis with respect to the frame portion; and
a light reflecting plate that is fixed to the movable portion and includes a light reflecting portion with a light reflecting property,
wherein the frame portion is provided so as to surround the movable portion,
the first shaft portion includes one end connected to the movable portion and the other end connected to the frame portion, and
the light reflecting plate is separated from the first shaft portion in a thickness direction and overlaps at least a part of the first shaft portion, as viewed from the thickness direction.

14. The optical scanner according to claim 13, further comprising:
a second shaft portion that is connected to the frame portion and supports the frame portion so as to be rotatable about the second axis,
wherein the light reflecting plate covers the entire second shaft portion, as viewed from the thickness direction.

15. The optical scanner according to claim 13,
wherein the light reflecting plate has a shape including a portion that protrudes in a direction along at least one of the first axis and the second axis, as viewed from the thickness direction.

16. The optical scanner according to claim 13, further comprising:
a permanent magnet that is provided in the frame portion;
a coil that is provided so as to face the frame portion; and
a voltage applying unit that applies a voltage to the coil,
wherein the voltage applying unit applies the voltage to the coil to rotate the movable portion about the first axis and the second axis.

17. An image display device comprising:
an optical scanner,
wherein the optical scanner includes:
a movable portion that is rotatable about a first axis;
a frame portion that is rotatable about a second axis intersecting the first axis;
a first shaft portion that supports the movable portion so as to be rotatable about the first axis with respect to the frame portion; and
a light reflecting plate that is fixed to the movable portion and includes a light reflecting portion with a light reflecting property,
wherein the frame portion is provided so as to surround the movable portion,
the first shaft portion includes one end connected to the movable portion and the other end connected to the frame portion, and
the light reflecting plate is separated from the first shaft portion in a thickness direction of the light reflecting plate and overlaps at least a part of the first shaft portion, as viewed from the thickness direction.

18. The image display device according to claim 17,
wherein the optical scanner includes:
a second shaft portion that is connected to the frame portion and supports the frame portion so as to be rotatable about the second axis,
wherein the light reflecting plate covers the entire second shaft portion, as viewed from the thickness direction.

19. The image display device according to claim 17,
wherein the light reflecting plate has a shape including a portion that protrudes in a direction along at least one of the first axis and the second axis, as viewed from the thickness direction.

20. The image display device according to claim 17, wherein the optical scanner includes:
a permanent magnet that is provided in the frame portion;
a coil that is provided so as to face the frame portion; and
a voltage applying unit that applies a voltage to the coil,
wherein the voltage applying unit applies the voltage to the coil to rotate the movable portion about the first axis and the second axis.

* * * * *